US009825360B2

(12) United States Patent
Miller et al.

(10) Patent No.: US 9,825,360 B2
(45) Date of Patent: Nov. 21, 2017

(54) SIDE LOBE MODULATION SYSTEM AND RELATED TECHNIQUES

(71) Applicant: Raytheon Corporation, Waltham, MA (US)

(72) Inventors: Tyler Miller, Gardena, CA (US); Jeffery J. Logan, Redondo Beach, CA (US); Harry Marr, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 451 days.

(21) Appl. No.: 14/599,794

(22) Filed: Jan. 19, 2015

(65) Prior Publication Data

US 2016/0211577 A1   Jul. 21, 2016

(51) Int. Cl.
| | | |
|---|---|---|
| *H01Q 3/24* | (2006.01) | |
| *H01Q 3/28* | (2006.01) | |
| *H01Q 3/34* | (2006.01) | |
| *G01S 7/00* | (2006.01) | |
| *H04K 3/00* | (2006.01) | |
| *G01S 13/86* | (2006.01) | |
| *G01S 7/36* | (2006.01) | |
| *G01S 13/78* | (2006.01) | |
| *G01S 7/38* | (2006.01) | |

(52) U.S. Cl.
CPC ............... *H01Q 3/24* (2013.01); *G01S 7/006* (2013.01); *H01Q 3/28* (2013.01); *H01Q 3/34* (2013.01); *H04K 3/00* (2013.01); *G01S 7/36* (2013.01); *G01S 7/38* (2013.01); *G01S 13/78* (2013.01); *G01S 13/86* (2013.01)

(58) Field of Classification Search
CPC ... G01S 7/006; G01S 7/36; G01S 7/38; G01S 13/78; G01S 13/86; H04K 3/00; H01Q 3/24; H01Q 3/26; H01Q 3/28; H01Q 3/34
USPC .......................................... 342/13, 16–19, 60
See application file for complete search history.

(56) References Cited

U.S. PATENT DOCUMENTS

| | | | | |
|---|---|---|---|---|
| 4,724,441 A | * | 2/1988 | Fithian | G01S 7/034 342/368 |
| 4,733,238 A | * | 3/1988 | Fiden | G01S 7/006 342/60 |
| 4,749,995 A | * | 6/1988 | Hopwood | H01Q 3/22 342/371 |
| 4,954,829 A | * | 9/1990 | Fiden | G01S 7/006 342/60 |
| 5,128,683 A | * | 7/1992 | Freedman | G01S 7/032 342/158 |

(Continued)

FOREIGN PATENT DOCUMENTS

| | | |
|---|---|---|
| EP | 0 390 334 A2 | 10/1990 |
| EP | 0 390 334 A3 | 10/1990 |

OTHER PUBLICATIONS

PCT Search Report of the ISA for Intl. Appl. No. PCT/US2015/054403 dated Dec. 18, 2015; 5 pages.

(Continued)

*Primary Examiner* — Peter M Bythrow
(74) *Attorney, Agent, or Firm* — Daly, Crowley, Mofford & Durkee, LLP

(57) ABSTRACT

Embodiments for providing side lobe modulation in a radio frequency (RF) transmitting are generally described herein. In some embodiments, an antenna side lobe is modulated to add data to the side lobe for communication with an intended recipient.

20 Claims, 18 Drawing Sheets

(56) References Cited

U.S. PATENT DOCUMENTS

| | | | | |
|---|---|---|---|---|
| 5,274,384 A * | 12/1993 | Hussain | ................... | H01Q 3/26 |
| | | | | 342/153 |
| 5,302,961 A * | 4/1994 | Murrow | ................ | G01S 7/2813 |
| | | | | 342/149 |
| 5,381,444 A * | 1/1995 | Tajima | .................. | G01S 13/762 |
| | | | | 342/118 |
| 5,917,430 A * | 6/1999 | Greneker, III | ............ | G01S 1/68 |
| | | | | 340/905 |
| 6,204,797 B1 * | 3/2001 | Wicks | ................... | G01S 7/2813 |
| | | | | 342/13 |
| 7,221,308 B2 * | 5/2007 | Burton | .................. | G01S 13/767 |
| | | | | 342/179 |
| 7,423,577 B1 * | 9/2008 | McIntire | ................. | G01S 7/006 |
| | | | | 342/57 |
| 7,436,877 B2 | 10/2008 | Karlsson | | |
| 7,761,092 B2 | 7/2010 | Desch et al. | | |
| 8,995,474 B1 * | 3/2015 | Fluckiger | ............ | H04L 27/0008 |
| | | | | 342/372 |
| 2007/0139253 A1 * | 6/2007 | Meyers | ................... | G01S 7/006 |
| | | | | 342/57 |
| 2010/0283656 A1 | 11/2010 | Zavrel, Jr. et al. | | |
| 2014/0329485 A1 * | 11/2014 | Calin | ..................... | H04B 15/02 |
| | | | | 455/296 |

OTHER PUBLICATIONS

PCT Written Opinion of the ISA for Intl. Appl. No. PCT/US2015/054403 dated Dec. 18, 2015; 6 pages.

PCT International Preliminary Report on Patentability for PCT Appl. No. PCT/US2015/054403 dated Aug. 3, 2017; 8 pages.

* cited by examiner

SIDE LOBE MODULATION SYSTEM AND RELATED TECHNIQUES

BACKGROUND

As is known in the art, a jamming signal can be used to reduce the effectiveness of a radar or communication system. In many cases, however, this same jamming signal can also interfere with unintended (so-called "friendly") communication channels. To address this problem, techniques for combining the communication signal with the jamming signal are known.

Conventional systems and techniques for communicating while jamming involve separating the communication and jamming signals in either the time or frequency domain. For example, the communications are sent either during times the jamming signal is turned off, or a small frequency band is left unjammed for the communications system to use. If encryption is to be used to prevent a third party (e.g. an adversary or "enemy" in a military application) from listening in, then there may be a shared key established beforehand. If an encryption key is not already shared between allies, to ensure security this key must itself be securely transmitted sometimes making use of encryption impractical.

As is also known, a far-field radiation pattern of most antennas includes a pattern of "lobes" at various angles. In a directional antenna in which the objective is to emit electromagnetic energy (e.g. radio frequency (RF) signals) ideally in one direction, the lobe in that direction has a larger field strength than the others and is typically referred to as a "main lobe" or "main beam." The other lobes which are not the main lobe are referred to as "side lobes."

Even in highly directional array antennas, antenna side lobes always exist. Electromagnetic energy emitted through such side lobes can be received by highly sensitive antenna systems. Excessive side lobe radiation wastes energy and may interfere with operation of other equipment. Accordingly, in conventional systems, attempts are made to reduce (and ideally minimize) antenna side lobe levels as much as possible, with no attempt to utilize them for additional functionality.

SUMMARY

Described herein are concepts, systems and techniques to utilize a side lobe of a radio frequency (RF) transmitting system to communicate with an intended recipient. In particular, data is transmitted via a side lobe of a transmitting system such that the data is readable only by an intended recipient. More particularly, digital data (i.e. bits) are represented by changing amplitude levels of one or more side lobes (i.e. amplitude modulating antenna side lobes). By directing (e.g. pointing) the one or more antenna side lobes toward an intended recipient, the intended recipient can detect changes in antenna side lobe amplitude and recover information being conveyed via the antenna side lobe modulation technique.

Described below are a plurality of different embodiments with various features. It should be appreciated that the described features may be included either individually or in any combination in any of the various plurality of different embodiments described herein.

In one embodiment, all desired data can be transmitted via a single antenna side lobe in a transmitting system. In other embodiments, data can be transmitted through different plural antenna side lobes in a transmitting system. In still other embodiments, portions of data can be transmitted via one or more side lobes of a plurality of different antennas. The plural antennas may be associated with the same transmitting system or with a plurality of different transmitting systems disposed in different locations.

By transmitting data through antenna side lobes from plural antennas located in several different geographic locations, no location (other than that of an intended recipient) will receive all data or even enough data to discover an underlying message. Alternatively, a single antenna can be used if either it or its intended recipient are non-stationary and cover disperse geographic location during the transmission interval. This may increase the total time needed to send a secure message as time must be allowed for movement of either antenna or target to take place.

In one embodiment, the side lobe level of at least one side lobe is controlled using a linearly constrained minimum-variance (LCMV) beam forming technique. Controlling an antenna side lobe level with such a technique allows additional information to be encoded in the side lobe with relatively little (and ideally minimum) changes to the main lobe waveform. Furthermore, since antenna side lobe levels are low relative to an amplitude level of a main lobe, the use of such relatively low side lobe levels also reduces the chance of (and ideally prevents) significant loss to a main lobe power level.

In embodiments, the transmitting system may be provided as a jamming system. Since power levels used in jamming signals tend to be relatively high, amplitude changes in antenna side lobe levels which are reduced by 30 db or more relative to a main lobe amplitude level can be detected by an intended recipient.

A data rate achieved using the concepts, systems and techniques described herein may be determined, at least in part, by a beam steering controller (BSC) steer rate and the dynamic range of the main lobe to peak side lobe power level. The dynamic range is affected in part by the noise of the system, the size of the array calibration errors and the number of antenna elements.

In accordance with one aspect of the concepts described herein, a system for transmitting information from a first radio frequency (RF) system to a second RF system includes an antenna radiation configurable to generate an antenna radiation pattern having a main beam and a side lobe and a beamformer having an input port and a plurality of beamformer output ports, each of said plurality of beamformer output ports coupled to at least corresponding one of a like plurality of antenna ports of said antenna, said beamformer capable of changing a characteristic of the antenna side lobe so as to convey information by changing the antenna side lobe characteristic.

In embodiments, the beamformer is capable of changing an amplitude of the antenna side lobe so as to convey information by changing the antenna side lobe amplitude characteristic.

In embodiments, the system modulates a plurality of side lobes to concurrently communicate with multiple intended targets (or intended recipients) by controlling the modulating of the plurality of side lobes at the same time. In embodiments, a power level of each of the plurality of side lobes is controlled separately.

In embodiments, the system further comprises a signal generation unit configured to generate a transmit signal waveform at an output port thereof, with the signal generation unit output port coupled to the input port of said beamformer wherein said beamformer is capable of modulating an amplitude of the antenna side lobe in response to a transmit signal waveform provided thereto from said signal generation unit.

In embodiments, the system further comprises an amplitude and phase adjustment circuit coupled between the plurality of beamformer output ports and the plurality of antenna ports. In embodiments, the amplitude and phase adjustment circuit is provided as a plurality of transmit-receive (T/R) modules, each of said T/R modules having an input coupled to a corresponding one of the plurality of beamformer output ports and having an output port coupled to a corresponding one the plurality of antenna ports.

In embodiments, the beamformer is capable of changing an amplitude of the antenna side lobe so as to convey information by changing the antenna side lobe amplitude characteristic using a linearly constrained minimum-variance (LCMV) beam forming technique.

In embodiments, the beamformer is capable of modulating the antenna side lobe amplitude using an LCMV beamforming technique so as to modulate an amplitude of the side lobe to represent digital bits.

In embodiments, the beamformer is capable of modulating a characteristic of the antenna side lobe so as to convey an encryption key, In embodiments, the beamformer is capable of modulating the antenna side lobe amplitude using an LCMV beamforming technique so as to modulate an amplitude of the side lobe to generate a sequence of digital bits corresponding to an encryption key.

In another aspect, a method for transmitting information from a first radio frequency (RF) system to a second RF system, includes directing an antenna side lobe toward the second RF system and modulating a characteristic of the antenna side lobe so as to convey information from the RF system to the second RF system.

In embodiments, modulating a characteristic of the antenna side lobe includes modulating an amplitude of the side lobe.

In embodiments, modulating a characteristic of the antenna side lobe includes modulating an amplitude of the side lobe to represent digital bits to the second RF system. In embodiments, this can be accomplished an LCMV beamforming technique.

In embodiments, modulating the antenna side lobe comprises controlling the antenna side lobe using an LCMV beamforming technique. In embodiments, modulating the antenna side lobe comprises controlling the antenna side lobe amplitude using an LCMV beamforming technique.

In embodiments, a characteristic of the antenna side lobe is modulated so as to convey an encryption key from the first RF system to the second RF system.

In embodiments, modulating a characteristic of the antenna side lobe includes controlling an amplitude of the antenna side lobe using an LCMV beamforming technique so as to represent digital bits to the second RF system to convey an encryption key from the first RF system to the second RF system.

In embodiments, a system transmits encrypted communications.

In embodiments, modulating a characteristic of an antenna side lobe comprises modulating an amplitude of the antenna side lobe to add data to the antenna side lobe for communication with a second system.

In embodiments, the system and method correspond to a jamming system and method. In embodiments, the system and method correspond to an RF jamming system and method.

It should be appreciated that all of the above-described features may be included individually or in any combination in the above-described system for transmitting information from a first RF system to a second RF system.

In accordance with a further aspect of the concepts described herein, a system for transmitting information from a first radio frequency (RF) system to a second RF system includes means for directing an antenna side lobe toward the second RF system; and means for modulating a characteristic of the antenna side lobe so as to convey information from the RF system to the second RF system. In embodiments, modulating a characteristic of the antenna side lobe comprises modulating an amplitude of the side lobe. In embodiments, modulating a characteristic of the antenna side lobe comprises modulating an amplitude of the side lobe to represent digital bits provided to the second RF system.

In embodiments, a system is capable of transmitting an electromagnetic signal via an antenna side lobe with the side lobe modulated to add data for communication with an intended target.

In embodiments, modulating the side lobe to add data to the side lobe for communication with an intended target includes modulating a plurality of side lobes to communicate with multiple targets at once by controlling the modulating of the plurality of side lobes at the same time, with a power level of each of the plurality of side lobes being controlled separately.

In embodiments, modulating the side lobe to add data to the side lobe for communication with an intended target further comprises reducing a usable dynamic range for each side lobe to compensate for power loss on the main lobe.

In embodiments, modulating the side lobe to add data to the side lobe for communication with an intended target further comprises applying a taper (e.g. via fixed or active tapering of the antenna aperture illumination, by applying a weighting to antenna elements, for example) such a technique may be used, for example, to improve performance when a target is near the main lobe (e.g. increasing the dynamic range of nearby side lobes, allowing use of the techniques described herein). Thus, while applying a taper does not improve overall main lobe performance, it increase the dynamic range of side lobes proximate the main lobe thereby allowing the techniques described herein to be used.

It should, of course, be appreciated that all embodiments described herein may be implemented with or without the use of a taper.

In embodiments, modulating the side lobe to add data to the side lobe for communication with an intended target further comprises setting a minimum side lobe power level determined by a noise of the system, the array calibration errors and the number of antenna elements.

In embodiments, transmitting the electromagnetic signal with the modulated side lobe further comprises transmitting the electromagnetic signal with the modulated side lobe from several disperse locations to prevent locations other than the intended target from receiving the data for the communication with the intended target.

It should be appreciated that all of the above-described features may be included individually or in any combination in the above-described system for transmitting information from a first RF system to a second RF system.

In accordance with a still further aspect of the concepts described herein a system for providing side lobe modulation to an electromagnetic signal, includes a waveform generator arranged to generate, for transmission, an electromagnetic signal having at least a main lobe and a side lobe, the waveform generator modulating the side lobe to add data to the side lobe for communication with an intended target and an antenna arranged to transmit the electromagnetic signal having the side lobe modulated to add data for communication with an intended target.

In embodiments, the waveform generator is capable of modulating an amplitude of the side lobe to represent digital bits to provide the communication with the intended target.

In embodiments, the antenna is capable of transmitting the electromagnetic signal with the modulated side lobe from several disperse locations to prevent locations other than the intended target from receiving the data for the communication with the intended target.

In embodiments, the waveform generator is configured to control the modulating of the side lobe using an LCMV beamforming technique.

In embodiments, the waveform generator further provides a data rate for the communication by the side lobe with the intended target based on a steer rate of a beamsteering controller (BSC) according to $Bit_{rate}=Steer_{rate} \cdot \log_2 M$, where $Steer_{rate}$ is the steer rate of the beamsteering controller and M is a number of distinct amplitude levels of the side lobe being used. It should of course, be appreciated that a steer rate may be provided from an apparatus other than a BSC.

In embodiments, a waveform generator modulates a plurality of side lobes to communicate with multiple targets at once by controlling the modulating of the plurality of side lobes at the same time, wherein a power level of each of the plurality of side lobes being controlled separately.

In embodiments, the waveform generator further applies taper to improve performance when target is near the main lobe.

It should be appreciated that the above-described features may be included either individually or in any combination in the above-described system for providing side lobe modulation to an electromagnetic signal.

BRIEF DESCRIPTION OF THE DRAWINGS

The foregoing features may be more fully understood from the following description of the drawings in which.

DETAILED DESCRIPTION

Figure 1:
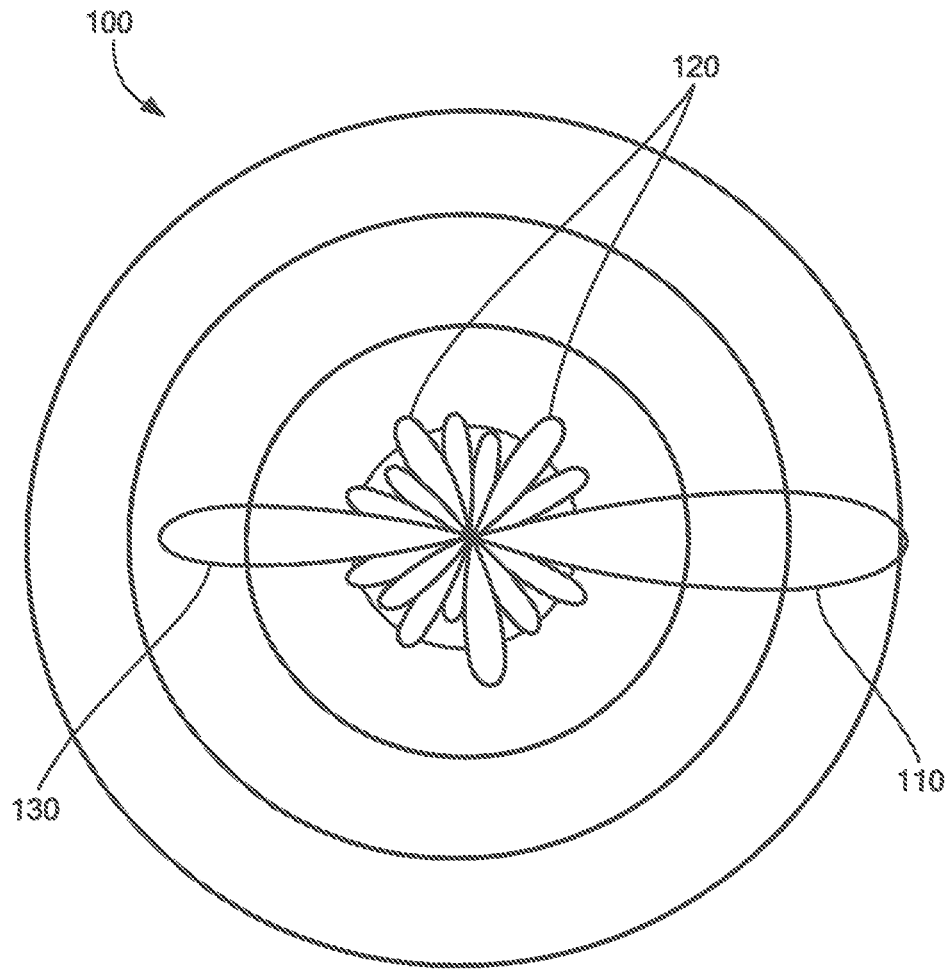
FIG. 1 is a polar plot of a far-field radiation pattern.

The following description and drawings sufficiently illustrate specific embodiments to enable one of ordinary skill in the art to practice them as well as the concepts illustrated thereby. After reading the description provided herein, those of ordinary skill in the art will appreciate that other embodiments may incorporate structural, logical, electrical, process, and other changes. Portions and features of some embodiments may be included in, or substituted for, those of other embodiments. All such embodiments should be construed as being within the scope of this disclosure.

A system and technique to add data to antenna side lobes is described herein in the context of a radio frequency (RF) transmitting system. It should be appreciated that the RF transmitting system may be a commercial or military radar, communication or jamming system. In particular, described is a system and technique to modulate antenna side lobe levels of an RF system so as to represent information (e.g. in the form of digital bits) that is readable by an intended recipient. More particularly, digital bits can be represented by amplitude changes in side lobes directed toward an intended recipient. In one embodiment, more than one antenna side lobe modulation system is used and at least some of the antenna side lobe modulation systems are disposed in different geographic locations. By transmitting from several disperse locations, no other location will receive all of (or even a sufficient amount of) data required to recover information being transmitted via the side lobe modulation technique described herein. In one illustrative embodiment, the method of controlling antenna side lobe levels is accomplished using a linearly constrained minimum-variance (LCMV) beam forming technique. This technique allows additional information to be encoded in one or more antenna side lobes with little, or ideally minimal, change to the main lobe waveform. It should be appreciated that LCMV is a technique that reduces (and ideally minimizes) the variance between all requested power levels and the actual levels generated. It should, of course, also be appreciated that other techniques may also be used. For example, a relatively simple approach (i.e. relatively simple as compared with LCMV, for example) for adjusting side lobe levels may be to sum two beams together. A first one of the beams corresponds to the original beam that defines the main lobe response and a second one of the beams may correspond to a lower power beam pointing at the recipient. This approach would result in larger errors in desired vs. actual power levels for each desired pointing direction. The effect on main lobe is essentially the same as adding extra noise, the power of which is determined by the number and power level of each side lobe being modified.

When the RF transmitting system is provided as a jamming system, since jamming powers are typically very high energy, amplitude changes in side lobes greatly reduced relative to a main beam level (e.g. by 30 dB or more) can be detected by an intended recipient. Furthermore, modulating a side lobe level which is significantly lower (e.g. 20 dB or more lower) than a main beam peak tends to avoid significant loss to main lobe power data rate.

A data rate of a communication path established via the side lobe modulating technique is determined by a plurality of factors including, but not limited to, a steer rate of a beamsteering controller (BSC) in the transmit system (e.g. the jamming system) as well as the antenna calibration and in those cases where the antenna is provided as an array antenna, the number of antenna elements, in the array.

Figure 2:
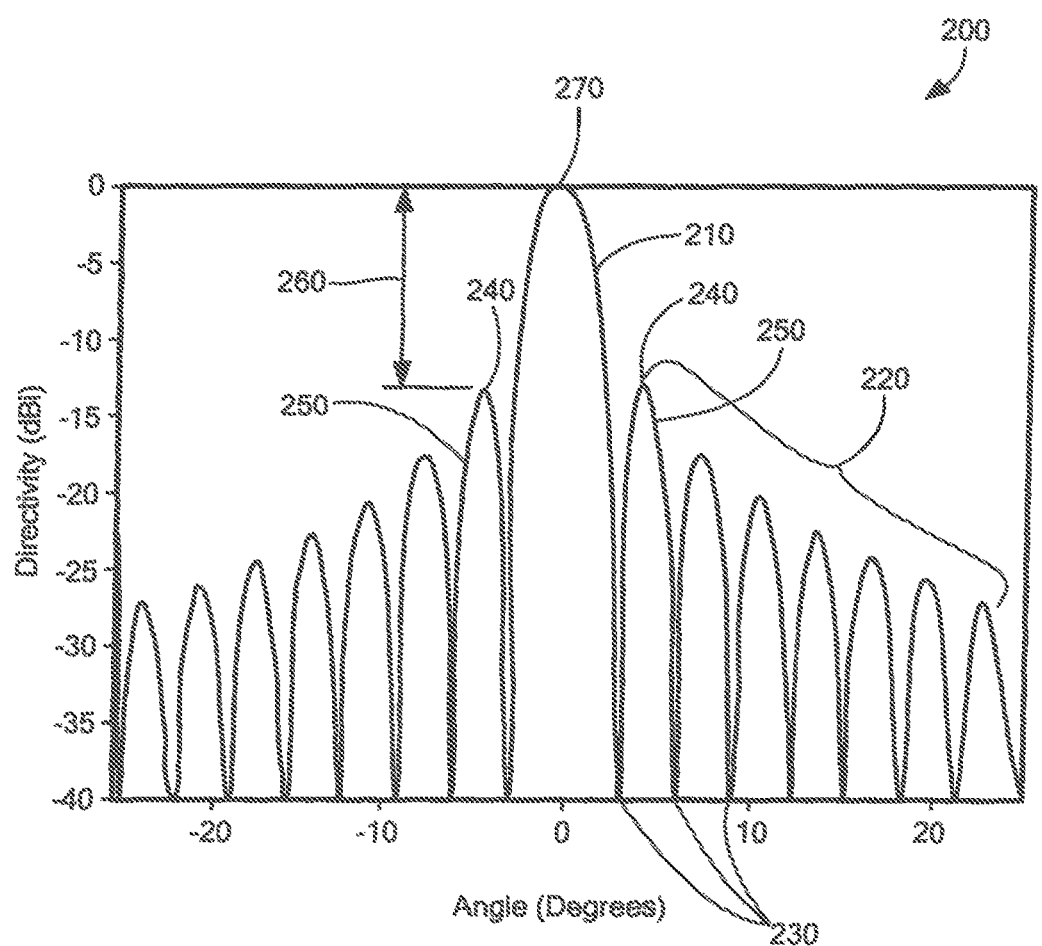
FIG. 2 is a plot of a far-field radiation pattern in a Cartesian coordinate system.

In FIGS. 1 and 2, some introductory concepts and terminology are explained.

Referring now to FIG. 1, an illustrative directional antenna far-field radiation pattern 100 (or more simply "antenna pattern 100") is plotted in a polar coordinate system. It should be appreciated that in FIG. 1, the radial distance from the center represents relative signal strength. The far-field radiation pattern is made up of a series of lobes 110, 120. In general, a lobe refers to a portion of the radiation pattern (i.e. a direction or angle) at which a radiated signal strength reaches a maximum, separated by nulls, which are directions or angles at which the radiated signal strength falls to a relatively low level (ideally zero). In a directional antenna, in which the objective is to emit electromagnetic energy in a desired direction, the lobe in the desired direction has a larger field strength than the others and is referred to as a main lobe or main beam which in this example is denoted by reference numeral 110. The other lobes are called side lobes and are designated by reference numeral 120. Typically, electromagnetic energy emitted through the side lobes is undesirable. In general it is undesirable to radiate energy in directions other than in the direction of the main beam 110. Thus, emission of electromagnetic energy through one or more side lobes is conventionally considered undesirable.

When signals are transmitted through an antenna, excessive radiation emitted via side lobes 120 wastes energy and may cause interference to other equipment.

Furthermore, in systems transmitting sensitive, confidential or even classified information, side lobe emissions may result in classified information being received by unintended receivers.

Furthermore, in receiving antennas, side lobes 120 may pick up interfering signals, and increase the noise level in the receiver. The power density in the side lobes 120 is generally substantially less than that in the main beam. One goal of many RF transmitting systems is to reduce (and ideally, minimize) the side lobe level (SLL), which can be measured in decibels relative to a peak of a main beam. The main lobe 110 and side lobes 120 occur for conditions of transmit, and for receive.

Referring now to FIG. 2, an antenna radiation pattern 200 is displayed in a Cartesian coordinate system. Thus, FIGS. 1 and 2 both illustrate antenna far-field radiation patterns, but do so in different coordinate systems.

In FIG. 2, a main lobe (or main beam 210), is shown centered around 0°. In FIG. 2, the main lobe 210 is shown having the greatest power density. The antenna pattern 200 includes side lobes generally designated by reference numeral 220 disposed on either side of the main lobe 210. Between each lobe (whether main lobe 210 or side lobes 220) are nulls designated by reference numeral 230. A peak 240 of first side lobes 250 are about −13 dB below a peak 270 of main lobe 210.

Figure 3:
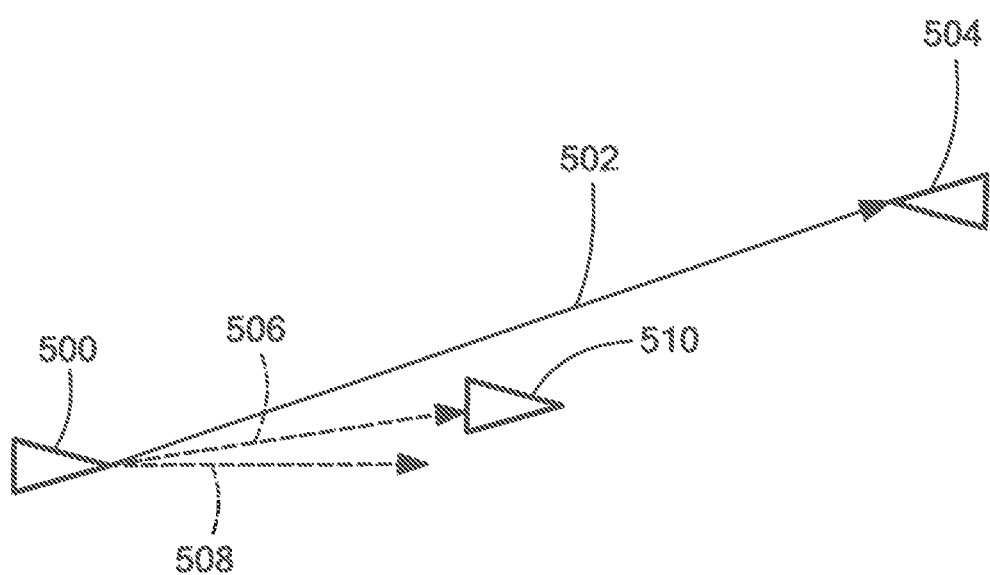
FIG. 3 is a diagram of a transmitting system which directs a main beam toward a first target and a modulated side lobe toward a second target wherein the side lobe modulation is only readable by the second target.

Referring now to FIG. 3, an RF system which is here illustrated as a jamming system 500, directs a main beam 502, which may be the same as or similar to main beams 110, 210 described above in conjunction with FIGS. 1 and 2, and one or more jamming signals toward a target 504 which includes a radio frequency (RF) system configured to either transmit RF signals, receive RF signals or both transmit and receive RF signals. By directing one or more jamming signals toward target 504 through main antenna beam 502, the jamming system 500 disrupts and interferes with the proper operation of radio frequency (RF) systems and circuits in target 504. Ideally, jamming system 500 transmits a high-power RF signal at or near the operating frequency of target 504. Thus, to transmit the maximum (or near maximum) amount of power toward target 504, the main beam of the transmit antenna of jamming system 500 is directed toward target 504.

Consequently, when main beam 502 is directed toward a target (e.g. target 504). side lobes 506, 508 of the jamming system transmit antenna are directed (or "pointed") at angles other than the angle at which the main beam is directed. In the illustrative embodiment of FIG. 3, side lobe 506 is directed toward a second target 510 with whom jamming system 500 wishes to communicate. Thus, a level of side lobe 506 is modulated in a manner which allows target 504 to capture data via side lobe 506 added to a signal in side lobe 506.

Since side lobe 506 is directed only toward target 510, the data within the side lobe signal is only readable by second target 510 and explicitly not readable by the first target 504. It should be appreciated that side lobe 506 in FIG. 3 may correspond to any of the side lobes illustrated in FIGS. 1 and 2, as long as that side lobe is directed toward the intended recipient (i.e. in this case target 510 is the intended recipient).

For the data being transmitted in the side lobe to be detectable above hardware thermal noise, environmental noise, and calibration errors, a minimum number of antenna elements are needed for a given number of amplitude levels M. Selecting the number of antenna elements to use in an array is dependent upon a variety of factors and may be most easily explained in terms of the dynamic range that can be used for the side lobe power levels. In general, every 6 dB of dynamic range allows 1 bit to be sent per beamsteer. To keep the main lobe power loss less than 0.5 dB, the top 10 dB of the range should not be used. It is also desirable to ensure the minimum side lobe level is well above the noise floor and calibration errors, so the lowest 10 dB will similarly not be used. Dynamic range is thus determined by system transmit noise, array calibration errors and number of array elements as:

$$\text{Side lobe dynamic range} = 10\log10(Nel * S / (\text{noise} + calErr)) - 20$$

$$= 10\log10(Nel) + SENR - 20$$

In which:
Nel is number of elements in the array antenna;
S is signal power in main lobe;
noise is transmit system noise;
calErr is array calibration error; and
SENR is Signal to calibration Error plus Noise Ratio.

For example, given an array comprised of 128 elements, and an SENR of 10, the usable dynamic range is 11 which is roughly enough for 2 bits per state, or M=4. These values are rough guidelines and are not meant to be hard limits. The only hard limit is that the number of side lobes that can be controlled at the same time is (Nel−1), similar to the limit on how many jammers can be nulled at once. It is possible to perform both nulling and side lobe modulation concurrently (or substantially concurrently), but the total sum of nulls+side lobes must be <=(Nel−1).

The bit rate may be calculated according to:

Bitrate=Steer$_{rate}$·log$_2$M, where:
Steer$_{rate}$ is the steer rate; and
M is a number of distinct amplitude levels of the side lobe being used.

It should be appreciated that the Steer$_{rate}$ value (or an equivalent value) may be provided from a beamsteering controller (BSC) or from an apparatus other than a BSC (e.g. any apparatus used to implement electronic beam steering in the phase array antenna, may provide the steer rate or equivalent steer rate information).

Systems may also use direct digital beamforming, thereby allowing beamsteering to occur at the same rate as the field-programmable gate array (FPGA) clock signals, allowing a Steer$_{rate}$ of 250 MHz. The number of amplitude states, M, may be estimated by looking at the total amplitude range available while keeping the effect on the main lobe relatively small.

Using the example above, if 128 elements are used and the SENR is 10 dB, then there is enough dynamic range for 2 bits (M=4). Using these parameters, the bit rate may be calculated as follows:

Bit rate=250 MHz*2 bits=500 Megabits per second (Mbps).

Figure 3A:
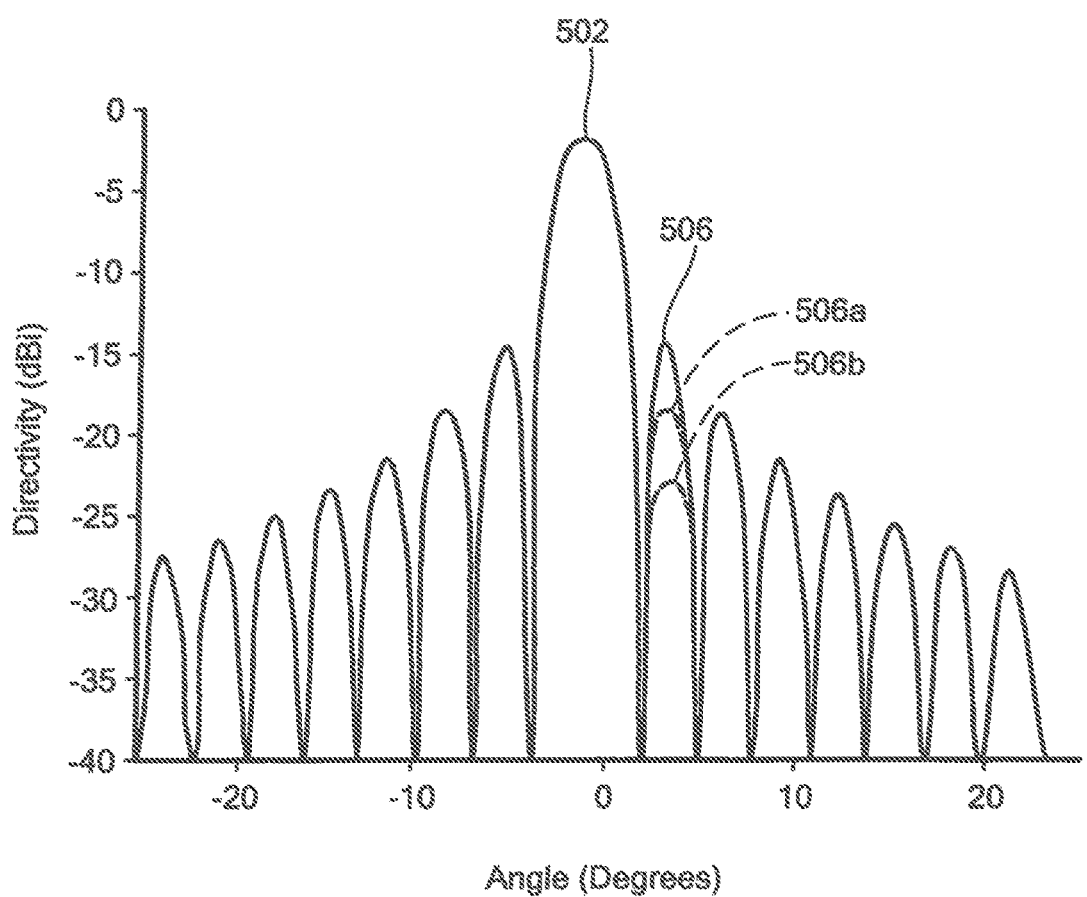
FIG. 3A is a plot which illustrates a modulated side lobe.

Referring now to FIG. 3A, a radiation pattern which may be the same as or similar to the radiation pattern used in the jamming system 500 described above in conjunction with FIG. 3, includes a main beam 502' and a side lobe 506'. The amplitude of side lobe 506' is adjusted to levels indicated by reference numerals 506a', 506b' at different points in time. Thus the level of side lobe 506' is being amplitude modulated to convey information to an intended recipient (or target) such as target 510 in FIG. 3) aligned in the path of side lobe 506'. It is easiest to describe side lobe amplitude adjustment in the LCMV framework. LCMV solves this system of equations using a least squares type approach:

$$\min_{w} \{w^H R_{xx} w\}$$

$$\text{s.t.} \quad w^H a(\theta) = c$$

Where w is the vector of weights for each array element, c is the constraint at each θ desired, $R_{xx} = x^* \cdot x^T$ and $$a(\theta) = e^{j\frac{2\pi}{\lambda}(\sin \theta)(m-1)d}$$

Where λ is the wavelength, m is the antenna element index and d is the spacing between linearly spaced elements. The optimal weight vector w is calculated as follows:

$$W_{LCMV} = c * \frac{R_{xx}^{-1} a(\theta)}{a^H(\theta) R_{xx}^{-1} a(\theta)}$$

In a conventional system where only the main lobe is of concern, the only constraint is $w^H a(\theta_0)=1$, or that the output in the steering direction equals 1. This system adds another constraint for each side lobe that is being controlled, such that θ and c are vectors, containing the desired direction angles and power levels respectively. When no jamming signals or targets are present in the signal x, then $R_{xx} \approx I$ (the identity matrix), and the equation simplifies into a sum of beam patterns for each desired direction and amplitude. It should be noted that this technique differs from the conventional approach of combining multiple signals for each desired direction, where each signal is derived from a unique waveform. This system uses the same single input waveform for all targets and adjusts the beam pattern to convey additional information on the side lobes. When jamming is present, this approach has the added benefit of adaptively nulling the jammers in addition to setting the side lobes to the desired amplitudes.

Figure 3B:
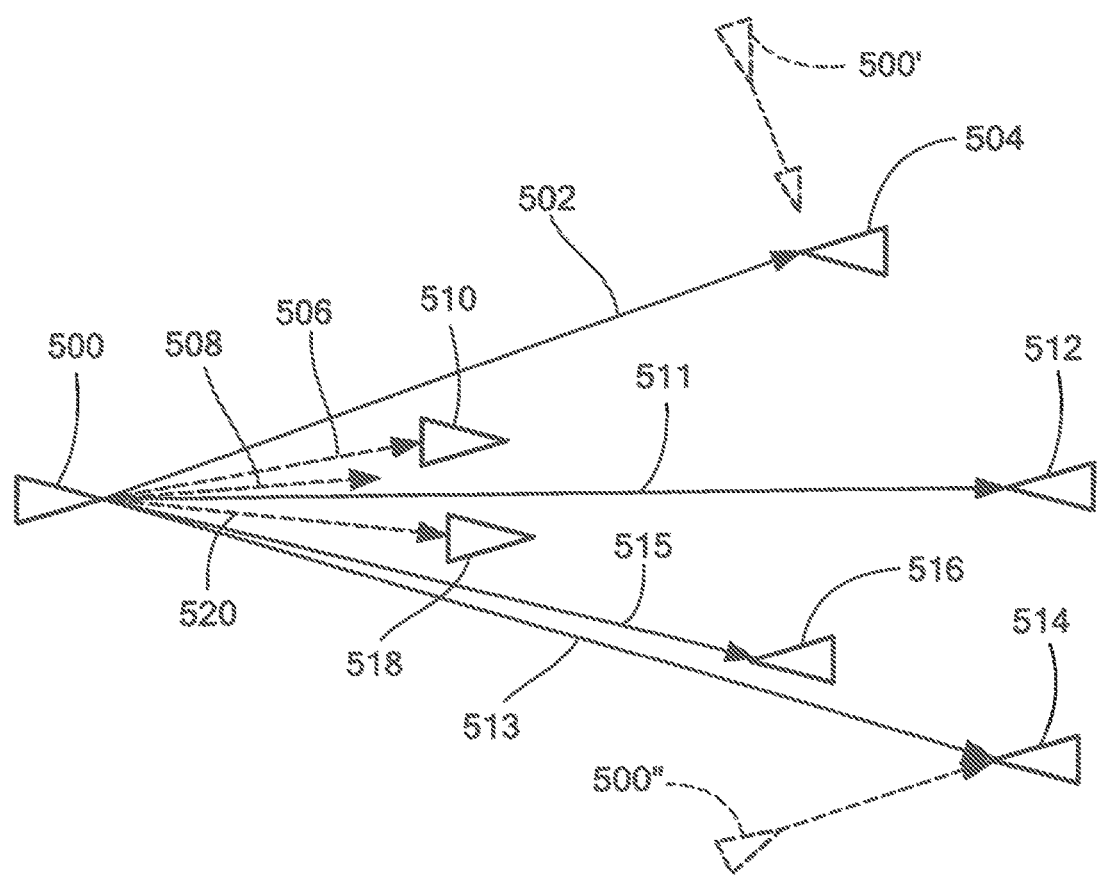
FIG. 3B is a diagram of a transmitting system which directs a main beam toward four different targets (at different points in time) and which directs modulated side lobes toward two different intended targets wherein the side lobe modulation is readable by the respective intended targets.

Referring now to FIG. 3B, in which like elements of FIG. 3 are provided having like reference designations, jamming system 500 directs jamming signals toward targets 504, 512, 514, 516. It should be appreciated that the system can only aim the main beam at a single target at any given instant in time. In some embodiments, the system directs the main beam at each target in succession while continuously communicating with two side lobe targets 510, 518.

Such jamming may be accomplished by re-directing (or steering) main beam 502 to the different targets (504, 512, 514, 516) (e.g. by utilizing a phased array antenna such as an AESA or an MSA) or by utilizing a plurality of separate transmit systems 500 which may be substantially co-located (i.e. within the same or nearby geographic location) or by utilizing separate RF transmit systems (e.g. multiple separate jamming systems) which are not co-located as indicated by systems 500', 500" (both shown in phantom in FIG. 3B) in combination with system 500.

While system 500 is jamming targets 504, 512, 514, system 500 is also concurrently communicating with targets 510, 518 via modulation of respective of side lobes 506, 520 using side lobe modulation techniques described herein. This may be advantageously accomplished if jamming system 500 includes an active electronically steered array (AESA) antenna through which both main beam steering and control of side lobe characteristics (e.g. amplitude characteristics) may be accomplished. It is significant to note that targets 510, 518, with whom jamming system 500 communicates, are not in the same direct line-of-sight as targets being jammed by jamming system 500 (i.e. targets 504, 512, 514, 516).

As illustrated in FIG. 3B, the side lobes 506, 520 of respective ones of jamming signals 502, 511, 513, 515, are used to add data to the transmitted waveform that is only readable by the intended recipient 510, 518. Digital bits can be represented by amplitude changes in the side lobes 506, 520 that are pointing towards respective ones of intended recipients 510, 518. It should be appreciated that while four targets are illustrated in the example of FIG. 3B, the system is capable of opetaration with fewer or greater than four targets. In particular, the system aims at each of N main beam targets in a desired orders (e.g. in succession) while continuously communicating with, here, two side lobe targets. It should, of course, be appreciated that the system may operate with any number of side lobe targets and that the number of side lobe targets may be greater than or less than the number of main lobe targets.

In the case where multiple jamming systems are located at respective ones of multiple different sites (e.g. jamming systems 500, 500', 500") no other location will receive all of the data because the transmitting system 500 will be transmitting from several disperse locations. Because only the desired side lobe level will be noticeably affected when its amplitude is changed, receivers in any other side lobe direction will be minimally affected, and thus cannot determine the amplitude of the controlled side lobe based on their observables. Narrowing the beam shape and making more diverse the transmission locations, decreases the size of the region (i.e. the geo physical location) in which another receiver must be located in order to receive all data (and likewise, narrowing the beam shape and making more diverse the transmission locations decreases the likelihood that a non-intended recipient will be able to receive enough data to decode communications between the two intended recipients).

The physical location of the targets, i.e., intended recipients 510, 518, is used to ensure only the targets 510, 518 receive data, while the jamming system still accomplish the main task of jamming, with little degradation in performance. Thus, by transmitting from several diverse locations, it is possible to arrange transmitting systems and targets such that only one point in space will receive all the data, allowing for secure communication.

As will be discussed below, transmitting data to multiple targets through multiple side lobes reduces the data rate to each target. This is due to effect each side lobe has on the power level of each other side lobe, thereby increasing probability of bit errors for a given embodiment.

However, analysis shows that two states (M=2) is still easily feasible with 30 targets, giving a data rate of up to 250 MHz to all of the targets simultaneously. This assumes, of course, that the targets fall into separate ones of the antenna side lobes (e.g. separate ones of side lobes 710 showing FIG. 7). If the targets exist at the same azimuth and elevation angles (i.e. they are in the same line-of-sight path), separate messages cannot be sent to each.

In one illustrative embodiment, the method of controlling the side lobe may be accomplished using a Linearly Constrained Minimum-Variance (LCMV) adaptive beamforming technique to constrain the results of the beamformer to allow additional information to be encoded in the side lobe with minimal change to the main lobe waveform. By ideally minimizing any changes to characteristics of the main beam (e.g. power, beam width, etc. . . . ), the target (e.g. an adversary in a military application) in the main lobe does not know anything has changed. LCMV passes signals from the direction of interest without distortion by imposing constraints on the array of coefficients and adaptively minimize the variance or power of the beamformer output subject to the imposed constraints. Thus, LCMV preserves the signal while minimizing the contributions from interfering signals and noise. LCMV is traditionally for a linearly spaced array of isotropic elements. Modifications can be made to a(θ) to accommodate other array configurations (i.e. non-linearly spaced). The calculation of $R_{xx}^{-1}$ inherently allows for non-isotropic radiating elements. It should, of course, be appreciated that any maximum likelihood or gradient descent type approach may be used to solve the system equations given above. Thus, the broad concepts described herein may use any technique that applies a weight vector to the array elements in an attempt to control the side lobe amplitudes.

In FIG. 3B, targets 510, 518 may correspond, for example, to unmanned aerial vehicles (UAVs commonly known as drones), sent into an environment. It should, of course, be appreciated that any targets (including, but not limited to UAVs, ground targets, manned vehicles, etc. . . . ) may be used. After determining the location of each target 510, 518, side lobe modulation may be used to communicate with each target 510, 518. As the targets 510, 518 move around, the location of each target 510, 518, at each time step, changes the direction of side lobes 506, 520 intended for each recipient 510, 518. Depending at least in part upon the movements of the drones, the communication may occur at low data rates to ensure the diversity of transmit directions and thus the security of said transmissions against interception by a listener in the background. By transmitting to the targets 510, 518 through respective ones of the side lobes 506, 520, communication may take place substantially simultaneously with (or concurrently with) the main jamming operation implemented via jamming signals directed towards targets 504, 512, 514, 516 via respective ones of beams 502, 511, 513, 515.

Figure 4:
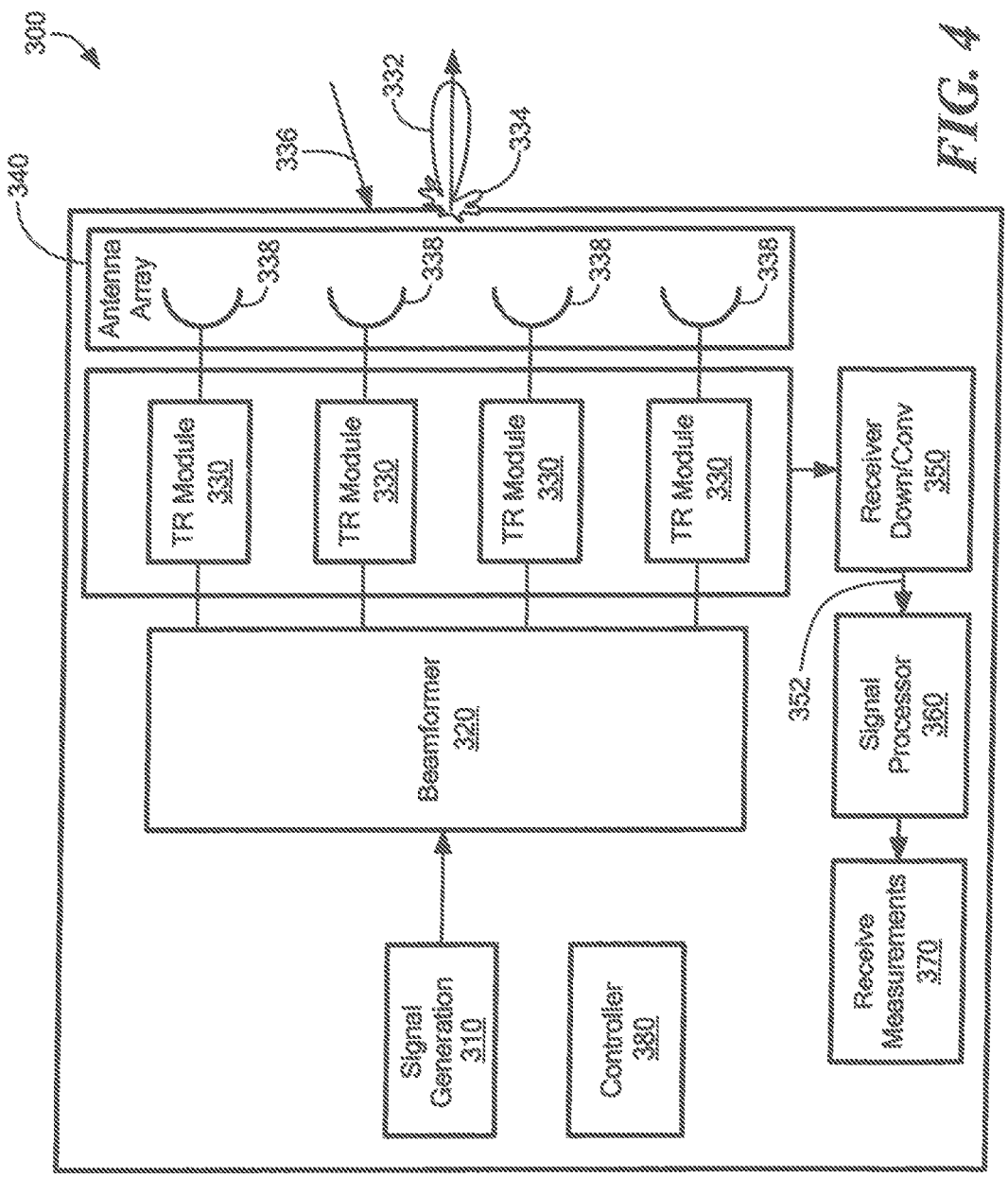
FIG. 4 is a block diagram of a radio frequency (RF) transmit and receive system (T/R) system which includes an active electronically scanned array (AESA) antenna and is capable of providing side lobe modulation.

Referring now to FIG. 4, an RF transmit receive system 300 includes an active electronically scanned array (AESA) antenna 340 having a signal generation module 310, a beamformer 320, and transmit/receive (TR) modules 330 coupled thereto. TR modules 330 include both amplitude and phase adjustment circuits (e.g. amplifiers and or phase shifting elements) as is generally known. The AESA antenna forms a main beam 332 at a desired angle (here boresight denoted as 336) and a plurality of side lobes generally denoted 334.

Amplitude and phase setting in either or both of beamformer 320 and TR modules 330 are selected to provide AESA antenna having a desired radiation pattern and beam pointing direction for main beam 332. Furthermore, a side lobe modulation technique may be implemented in beamformer 320. For example beamformer 320 may implement the above-mentioned LCMV beamforming technique to implement side lobe modulation.

Signal generations unit 310 which includes a transmit signal source generates a signal which is provided to an input of beamformer 320. Beamformer 320 receives the transmit signal provided thereto performs appropriate processing and then provides a plurality of beamforming signals to transmit input ports of respective ones of T/R modules 310. T/R modules 310 amplifier and phase adjust the signals according to a desired weighing and/or side lobe modulation technique and provide the signals to respective radiators 338 in array antenna 340.

Received signals 336 are provided to a receiver 350 that downconverts the frequency of the received signals for signal processing. A signal processor 360 generates received measurements 370 from the downconverted received signals 352. For example, the signal processor 360 may processes the downconverted received signals 352 using known processing methods to extract the position, velocity, direction of motion, and the type of target. A controller 380 may be provided to control the transmit and receive functions of the AESA radar system 300.

Figure 5:
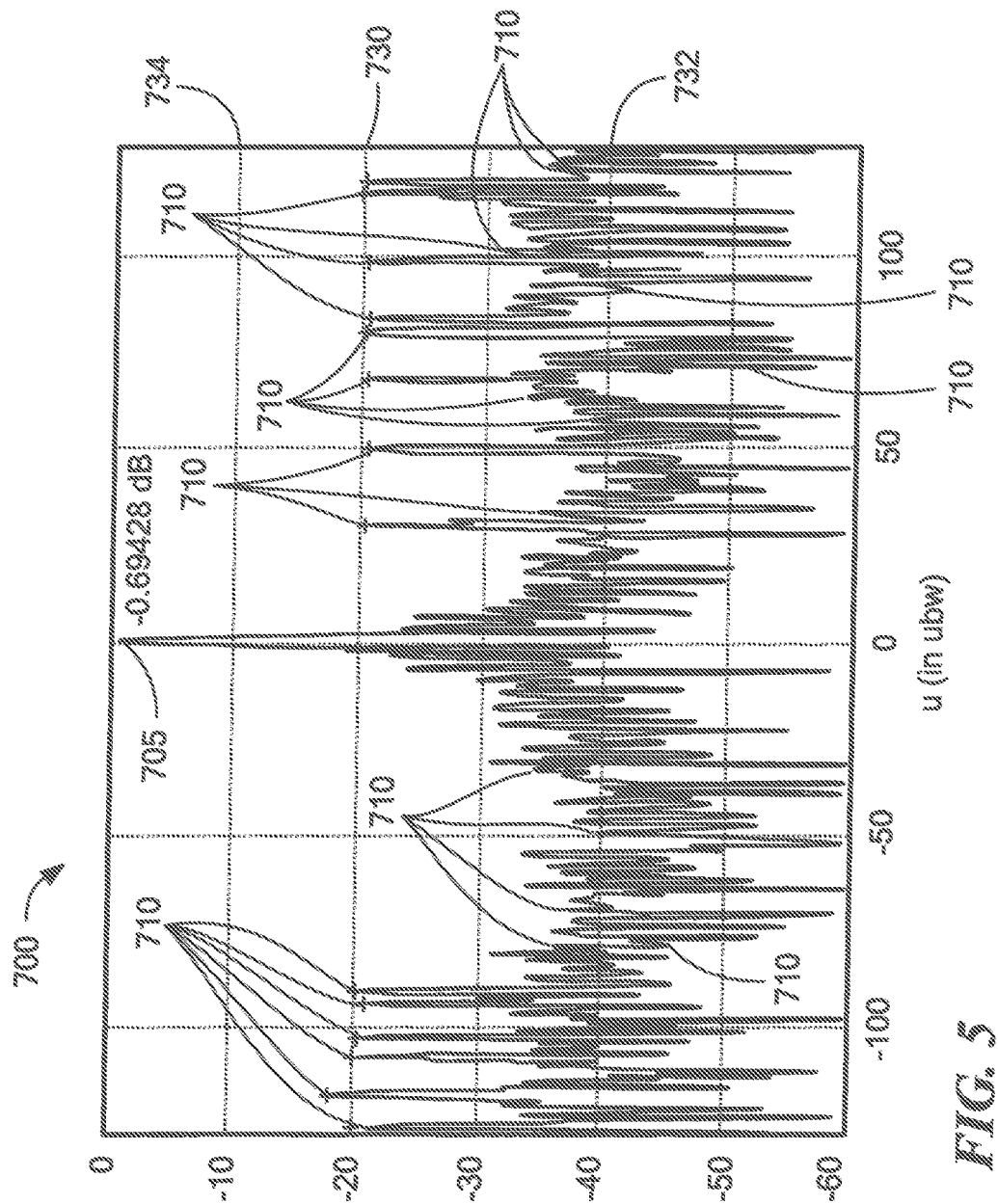
FIG. 5 is a plot showing manipulation of the side lobe level according to an embodiment.

Referring now to FIG. 5, a plot 700 showing a waveform for a target which includes a main beam 705 and a plurality of side lobes 710 along with noise and calibration errors. The plot of FIG. 5 may correspond, for example to the output of system 300 (FIG. 4) where main beam 705 is similar to beam 332 (FIG. 4) and side lobes 710 and similar to side lobe 334 (FIG. 4). To generate the data plotted in FIG. 5, a system having an array antenna comprising two hundred and fifty-six (256) antenna elements was used with an array calibration error of −15 dBi and each side lobe having two amplitude states. Digital bits can be represented by amplitude changes in the side lobes 710. If the side lobes are pointing towards a desired receiving party (a so-called intended recipient or friendly unit) the desired receiving party can decode or otherwise receive the digital bits.

The use of multiple side lobes 710 enables communication with multiple targets at once. However, this increases the power loss on the main lobe 705. Such power loss can be compensated by reducing a usable dynamic range for each side lobe 710. In FIG. 5, the usable dynamic range is −20 dB to −40 dB designated by reference numerals 730, 732, respectively. With a maximum side lobe power of −20 dB 732 instead of −10 dB 734, up to 30 targets can exist before main lobe power loss exceeds 0.5 dB. Further, radar and jamming powers, i.e., provided by the main lobe 720, are very high energy, so even side lobes that are 30 dB or more below peak power of the main lobe (e.g. side lobes 710) may be easily detected by an intended recipient (e.g. an ally in a military application). As described above, low relative power levels for the side lobes 710 may be used to reduce any significant loss of power to the main lobe 720.

Figure 6:
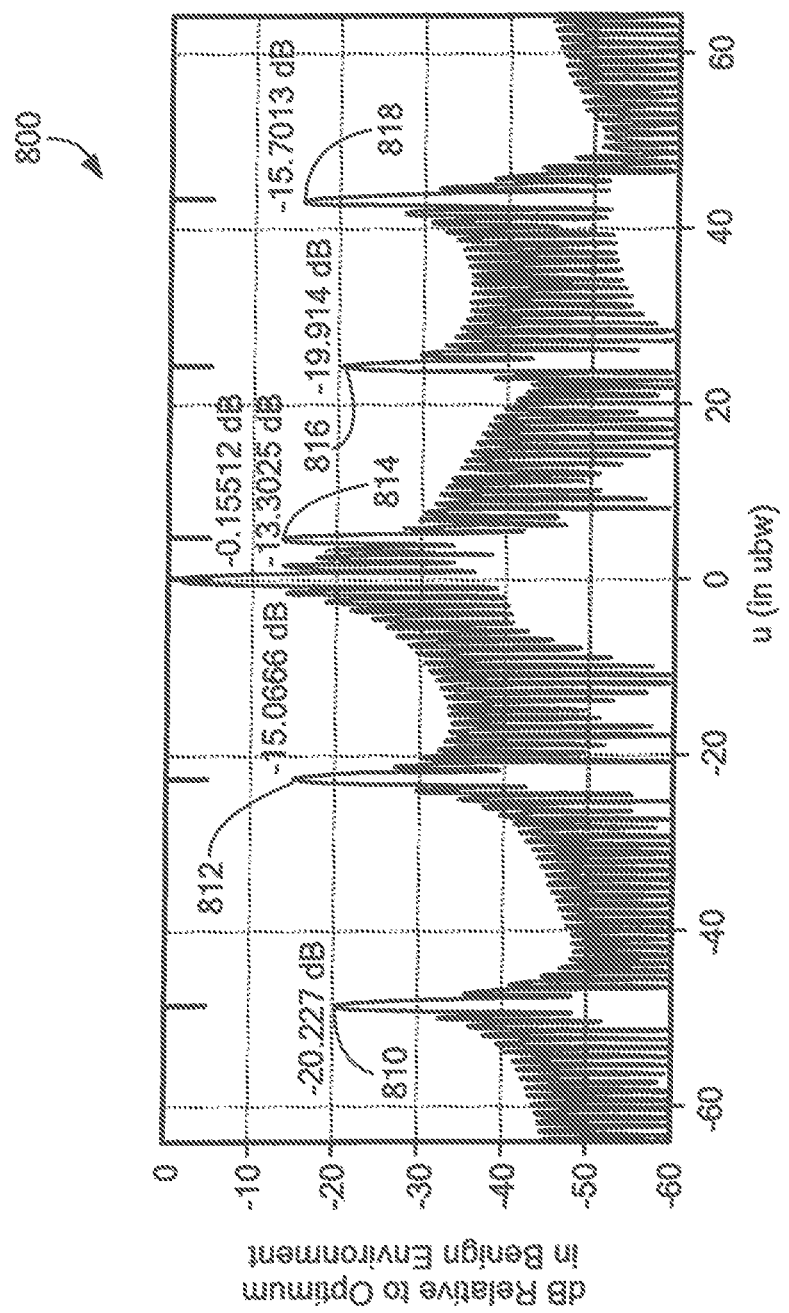
FIG. 6 is a plot showing manipulation of the side lobe level in a benign environment according to an embodiment.

FIG. 6 is an antenna radiation pattern 800 which illustrates manipulation of the side lobe level according to an embodiment which utilizes an LCMV technique. From FIG. 6, it can be observed that manipulation of the power levels for side lobes 810, 812, 814, 816, 818 at specific angles does not significantly affect the main lobe power. The power levels are −20 dB for side lobe 810, 15 dB for side lobe 812, 15 dB for side lobe 814, 20 dB for side lobe 816 and 15 dB for side lobe 818. Minimal loss in jamming effectiveness occurs by adding this technique.

Figure 7:
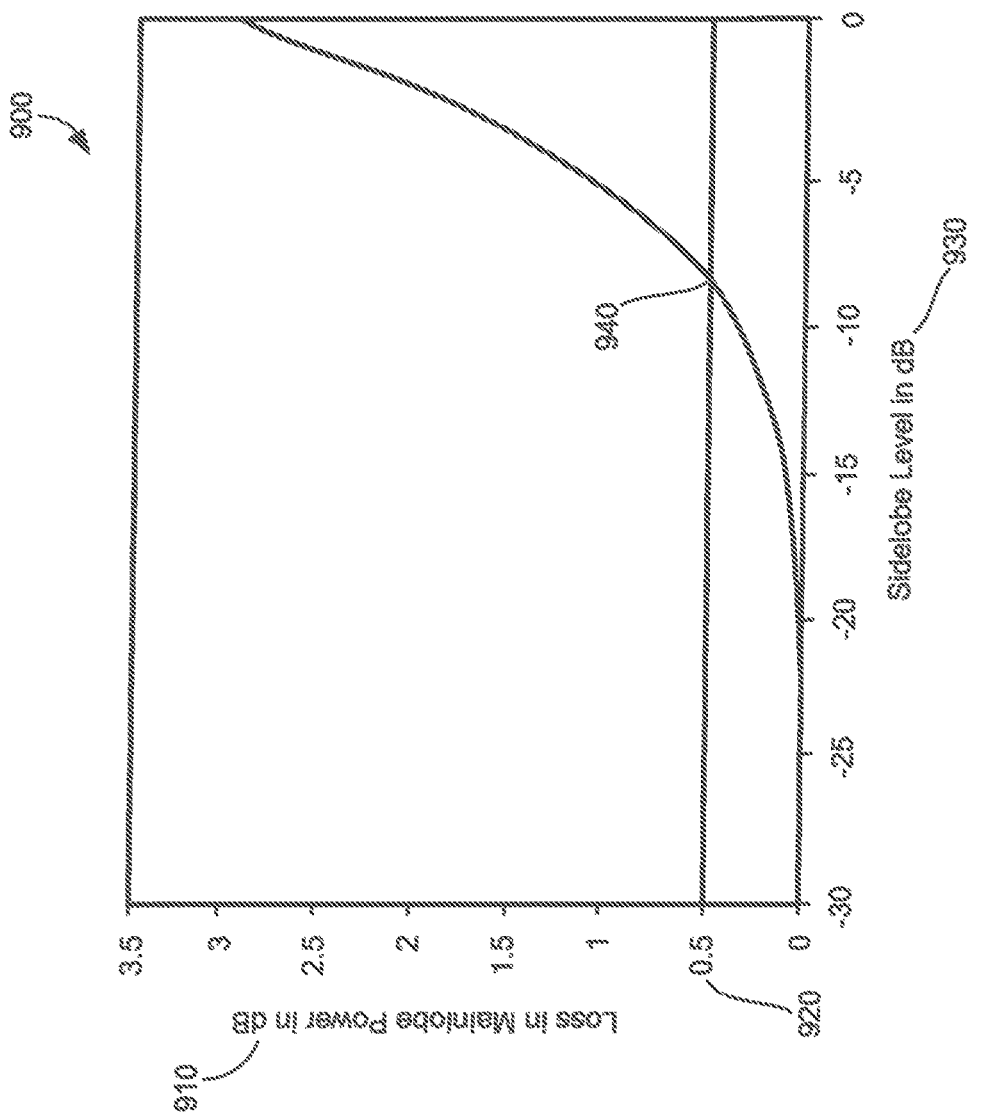
FIG. 7 is a plot illustrating the main lobe power loss due to the power level of a single side lobe according to an embodiment.

FIG. 7 is a plot 900 illustrating main lobe power loss due to the power level of a side lobe. As shown in plot of FIG. 7 the main lobe 910 does not experience more than 0.5 dB loss (indicated by reference numeral 920) until the power level of the side lobe 930 is above −8 dB (as indicated by reference numeral 940). It should be appreciated that if the number of elements in the array is decreased, then the affect is larger and the 0.5 dB threshold will be met at a lower side lobe level. The converse is also true (i.e. if the number of elements in the array is increased, then the affect is smaller and the 0.5 dB threshold will be met at a higher side lobe level). Thus, it should be appreciated that the number of elements in the array affects the relationship between side lobe power level and main lobe power loss.

Figure 8:
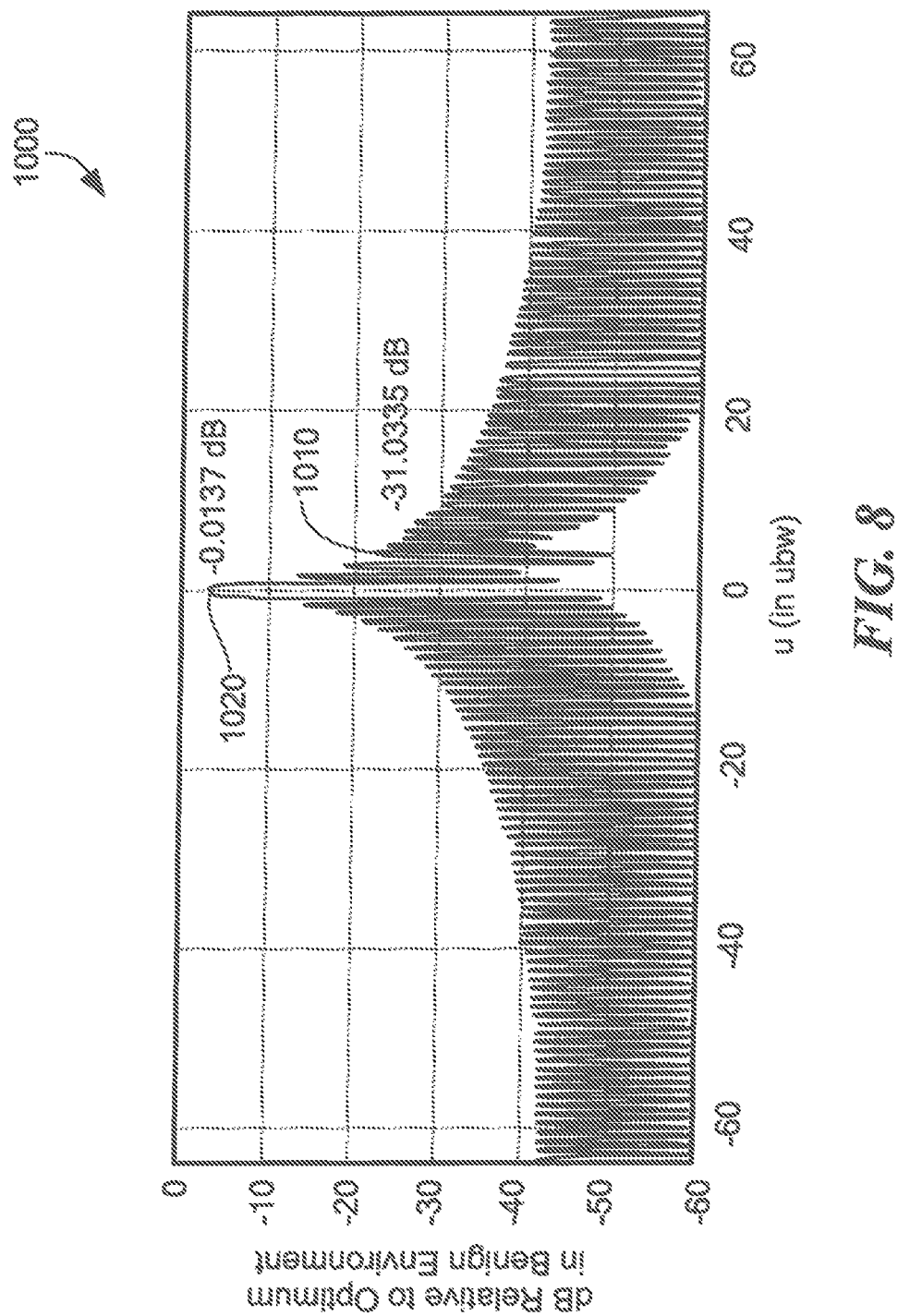
FIG. 8 is a plot of an antenna radiation pattern having a side lobe target close to a main lobe and no tapering applied.

FIG. 8 is a plot 1000 of a radiation pattern where a side lobe target is close to the main lobe according to an embodiment. Poor performance is experienced when the target 1010 is close to the main lobe 1020. Accordingly, the first few side lobes cannot be controlled effectively without a taper being applied.

Figure 9:
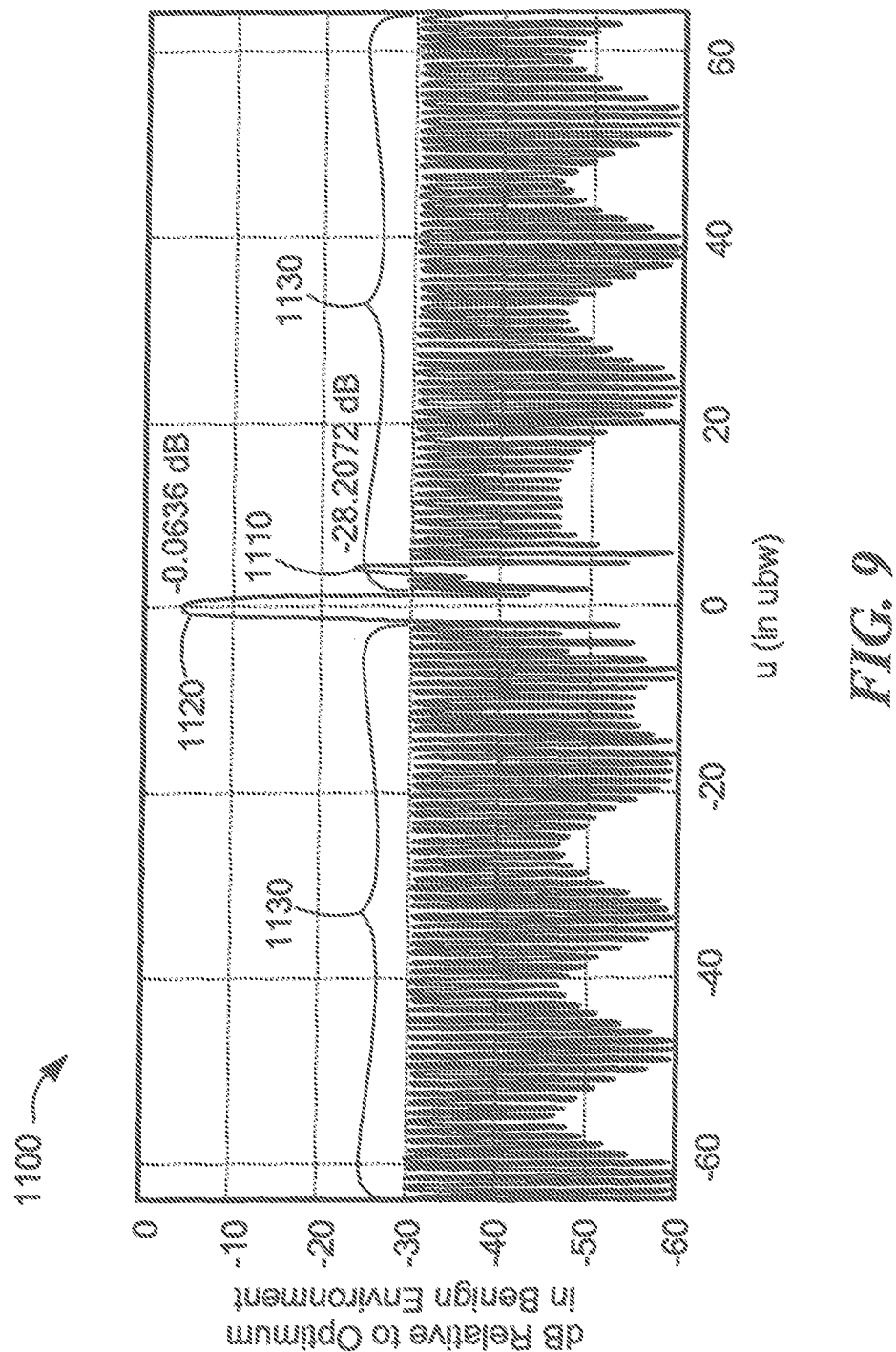
FIG. 9 is a plot of an antenna radiation pattern having a side lobe target close to a main lobe and utilizing tapering to allow control of said side lobe
Figure 10:
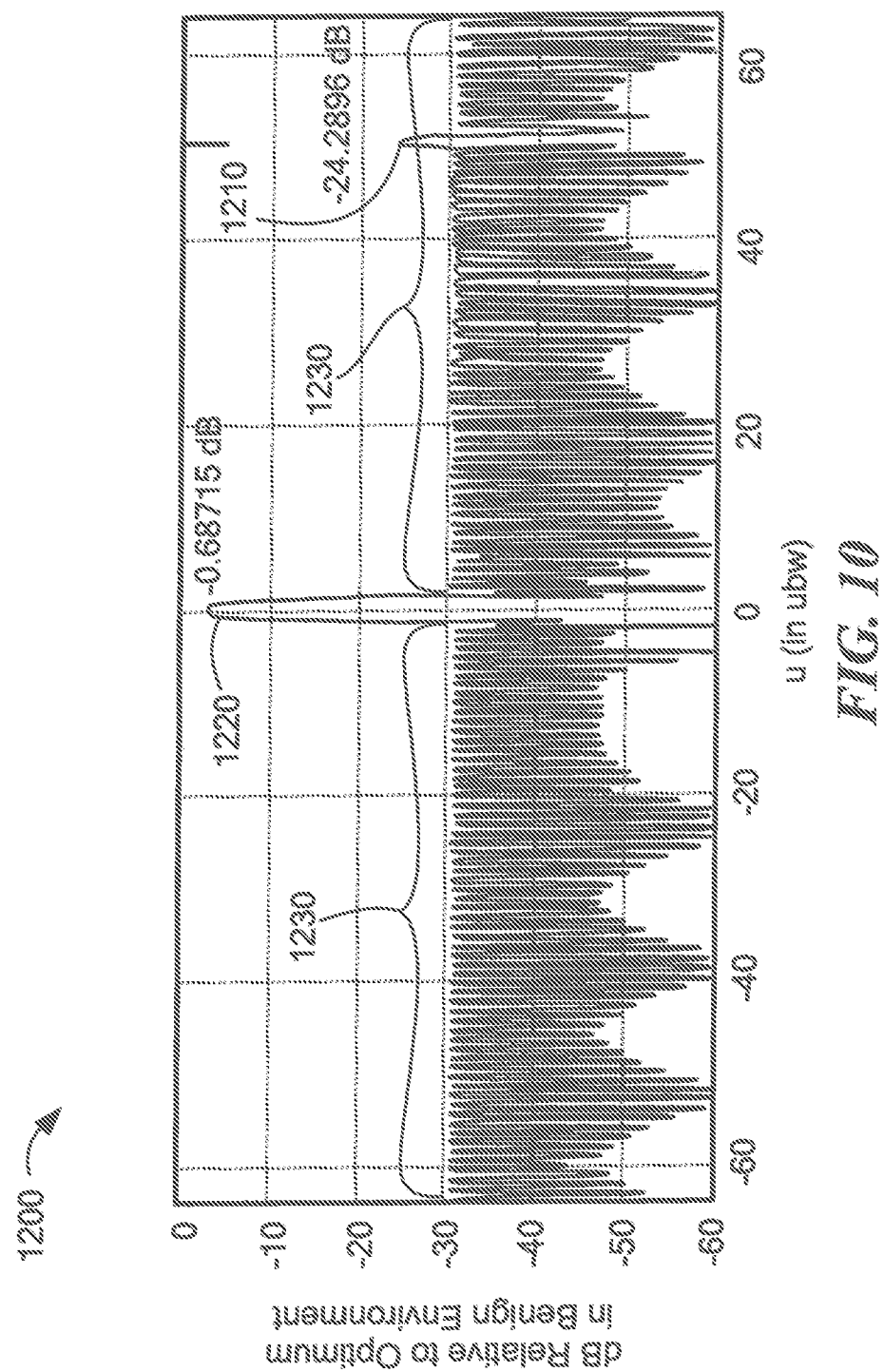
FIG. 10 is a plot showing tapering when a side lobe is disposed away from the main lobe according to an embodiment.

FIG. 9 is a plot 1100 showing the use of tapering according to an embodiment. In FIG. 10, the side lobe 1110 is again shown close to the main lobe 1120. However, a taper 1130 is applied to improve control of the side lobe 1110 for a target close to main lobe 1120. Tapering is a technique that is often used to reduce side lobes 1110, wherein the illumination distribution of the AESA may be tapered to gradually decrease in magnitude from the center of the array outwards to the edges of the array. However, other tapering methods may be applied, e.g., to suppress the noise surrounding the side lobes 1110. To achieve a given level of side lobe 1110 suppression in an array antenna, amplitude tapering is generally employed.

In FIG. 9, tapering 1130 may be obtained by driving the elements within the rows and/or columns of the array at different excitation levels, with the excitation level at the center of a particular row or column of antenna elements being greater than the excitation levels toward the ends of the row or column of antenna elements. The excitation levels may be controlled using taper weights that are selected to obtain a predetermined pattern.

Figure 11:
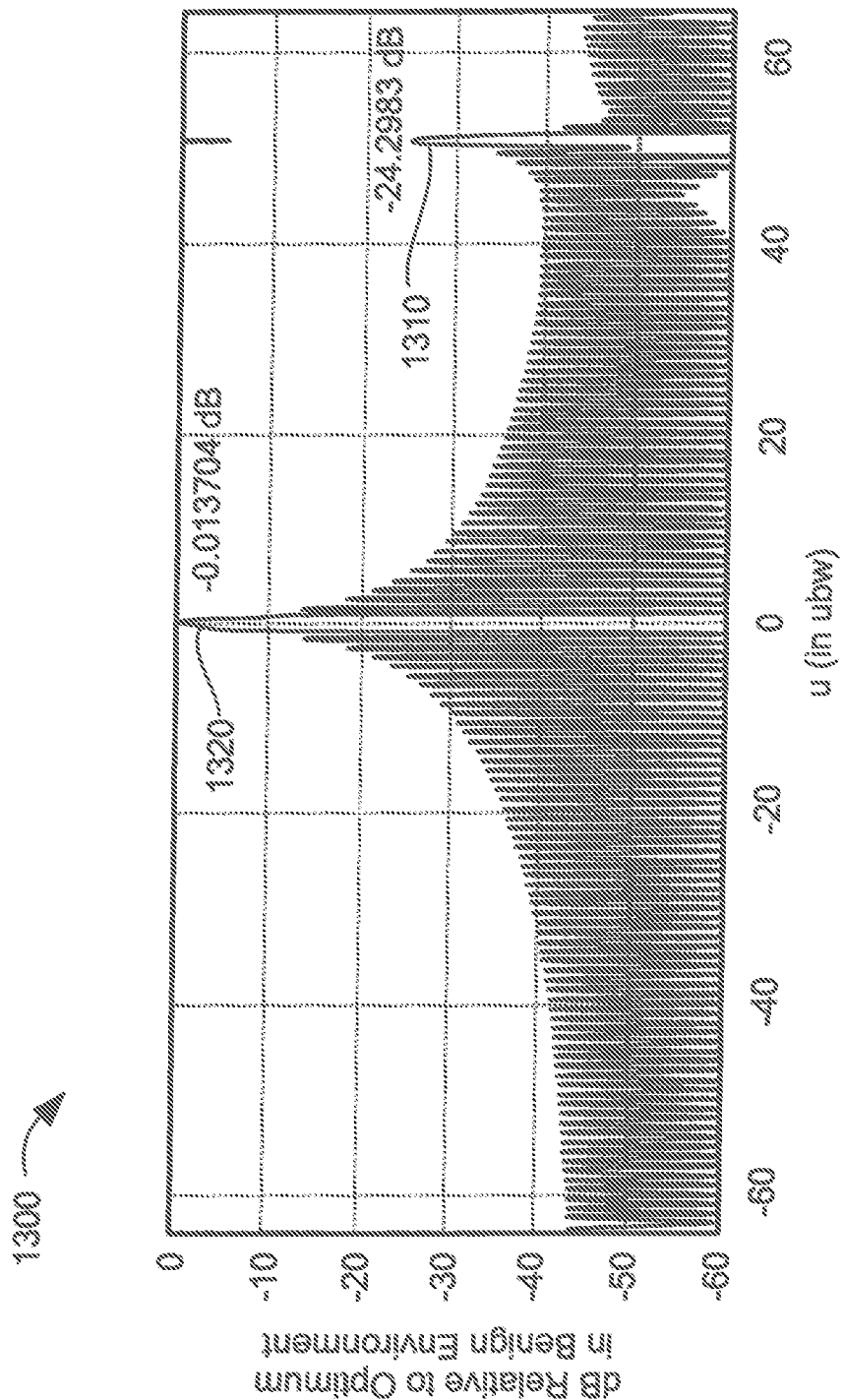
FIG. 11 is a plot showing the signal of FIG. 12 without tapering being applied according to an embodiment.

FIG. 10 is a plot 1200 showing tapering when a side lobe is disposed away from the main lobe according to an embodiment. In FIG. 11, the side lobe 1210 is disposed away from the main lobe 1220. Tapering 1230 is applied and has a small negative effect on the power level 1240 of the side lobe 1210 disposed away from the main lobe 1220.

Taper weights may be selected to minimize the average power level of the side lobes at the expense of widening and reducing the amplitude of the main beam. Side lobe 1210 (which is away from the main beam) may still be used to communicate with a target. FIG. 11 is a plot 1300 showing the signal of FIG. 10 without tapering being applied according to an embodiment. As can be seen in FIG. 11, the side lobe 1310 is disposed away from the main lobe 1320. Thus, the side lobe 1310 may still be controlled effectively without taper being applied. It should be noted that the performance of this side lobe is minimally affected be applying a taper, since it is so far away from the main lobe. In this case, and other similar cases, it would be better to avoid the use of a taper in order to improve main beam performance.

Figure 12:
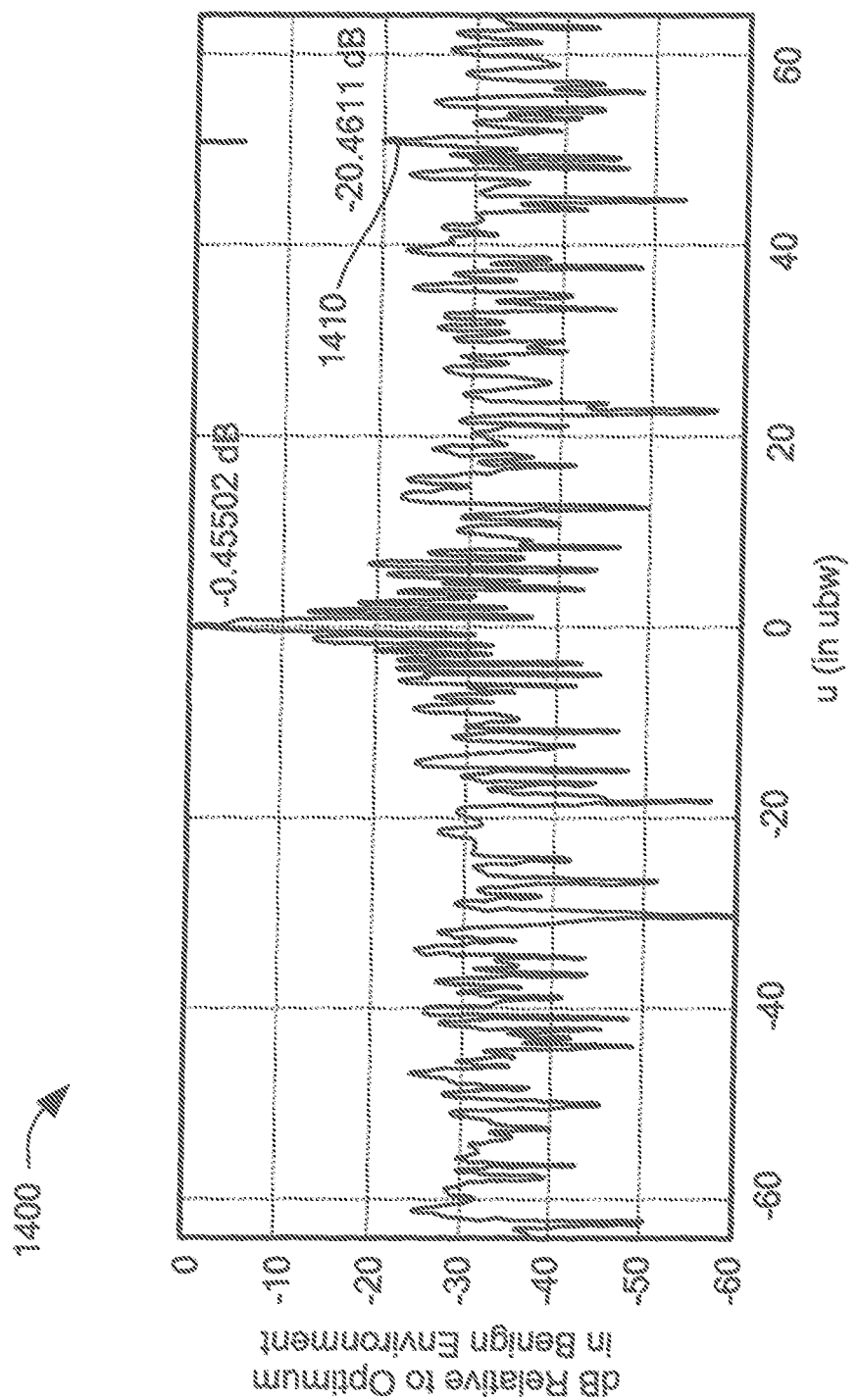
FIG. 12 is a plot showing the effect of a high noise power according to an embodiment.

FIG. 12 is a plot 1400 showing the effect of noise power level according to an embodiment. In FIG. 12, the noise power is −10 dB relative to signal power. The maximum acceptable noise power for this type of system is determined by the number of elements, e.g., 128 elements here, and a predetermined power level of the side lobe 1410. The maximum allowable noise power is calculated according to:

$$\text{MaxNoise (in dB)} < \log 10(\text{numElements}) + \text{trgtPwr(in dB)} - 10.$$

Figure 13:
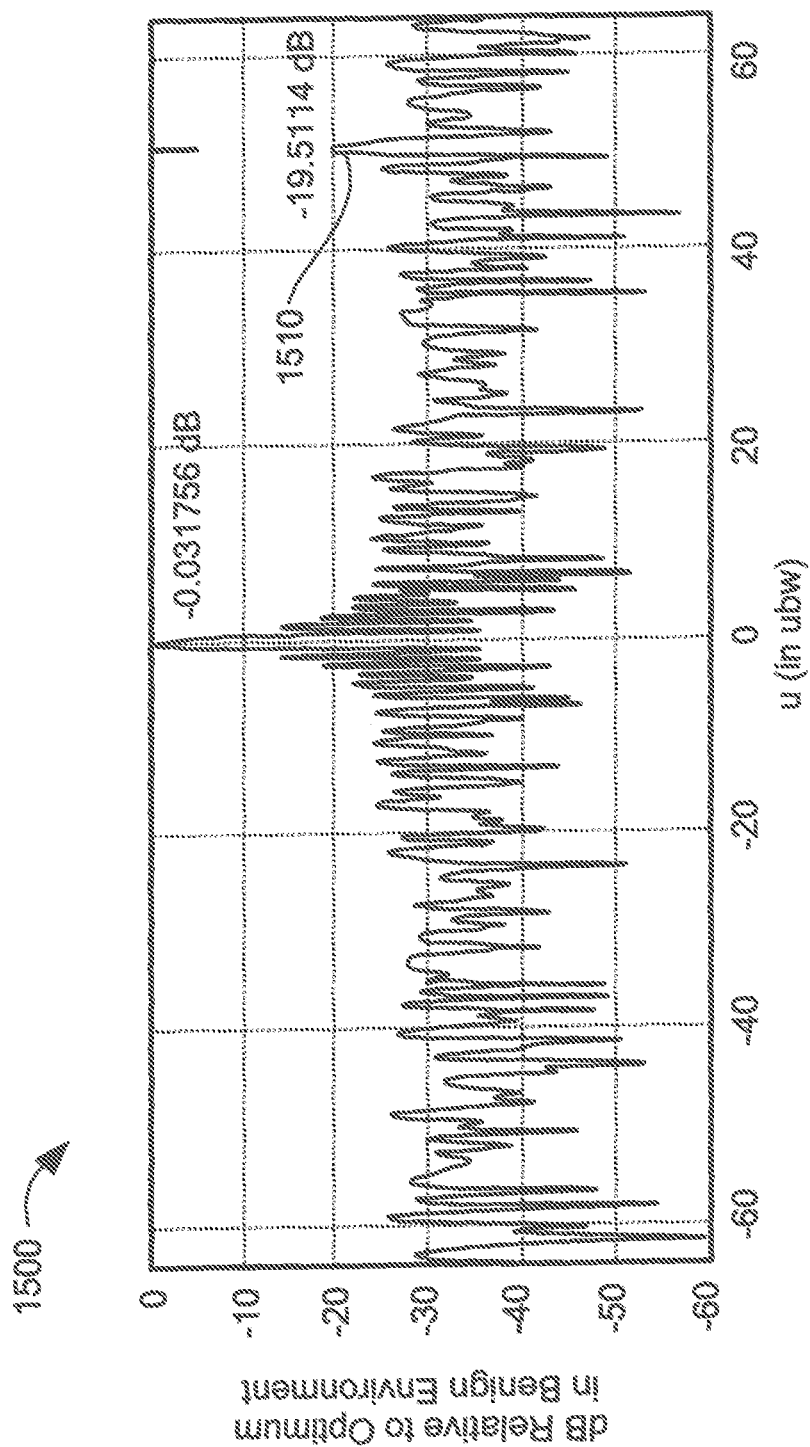
FIG. 13 is a plot showing the effect of element calibration errors according to an embodiment.

FIG. 13 is a plot 1500 showing the effect of element calibration error according to an embodiment. In FIG. 13, the calibration error is −10 dBi. The target power is −20 dB. The element calibration error is below a maximum level, as determined by the number of elements, e.g., 128 elements here, and a selected power level of the side lobe 1510. The maximum allowable calibration error is calculated according to:

$$\text{MaxCalError(in dBi)} < \log(\text{numElements}) + \text{trgtPwr(in dB)} - 10.$$

Figure 14:
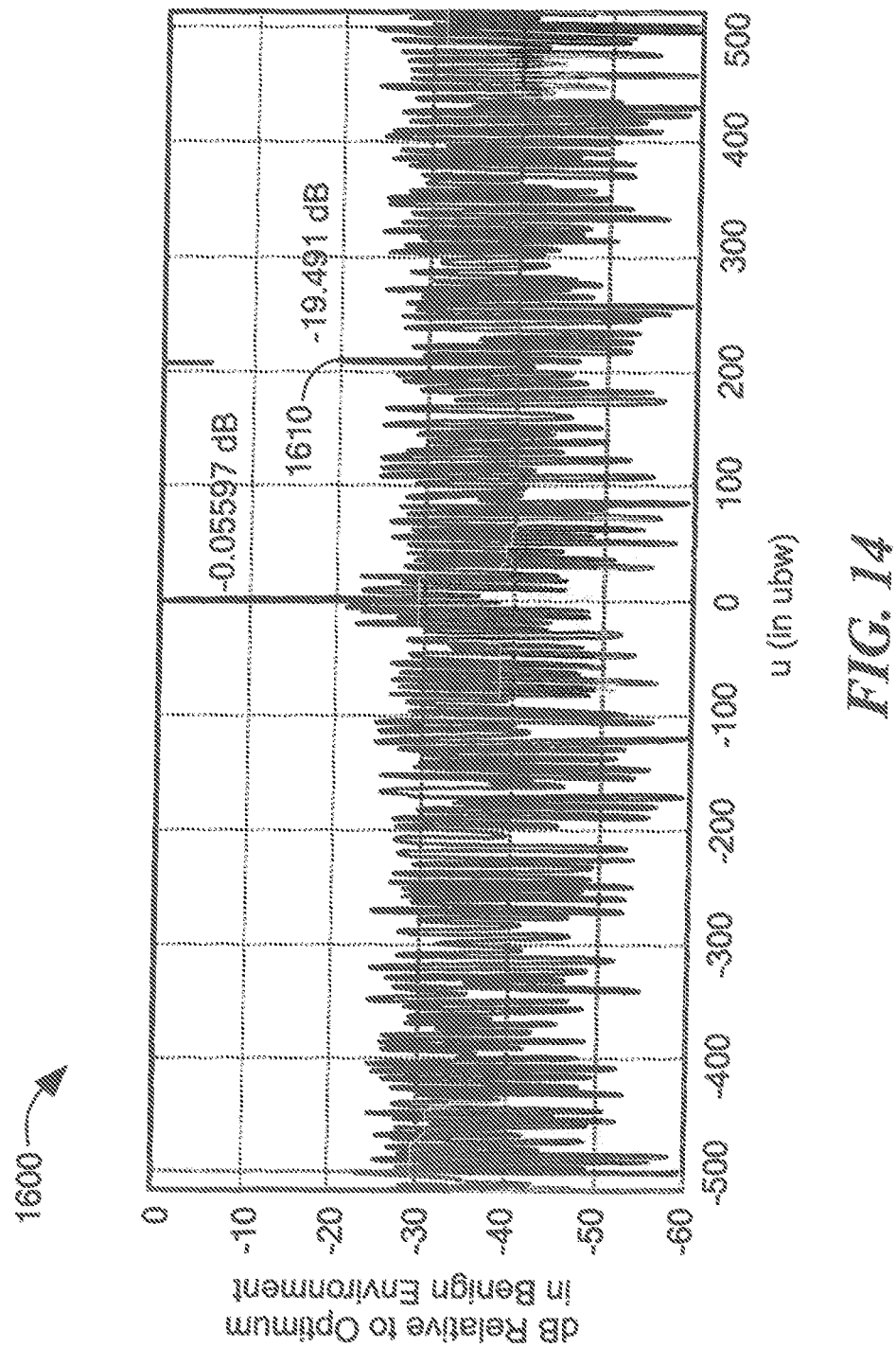
FIG. 14 is a plot showing a larger calibration error and more antenna elements according to an embodiment.

FIG. 14 is a plot 1600 showing a larger calibration error according to an embodiment. In FIG. 14, the calibration error is −1 dBi. The target power is −20 dB. Thus, the power level of the side lobe 1610 is −20 dB. More elements must be used to provide the same performance as shown on plot 1500 because of the larger calibration error. If calibration error is ~9 dB higher, then similar performance is possible by having 8 times more elements. The reverse is also true, i.e., a smaller number of elements results in smaller calibration errors.

Figure 15:
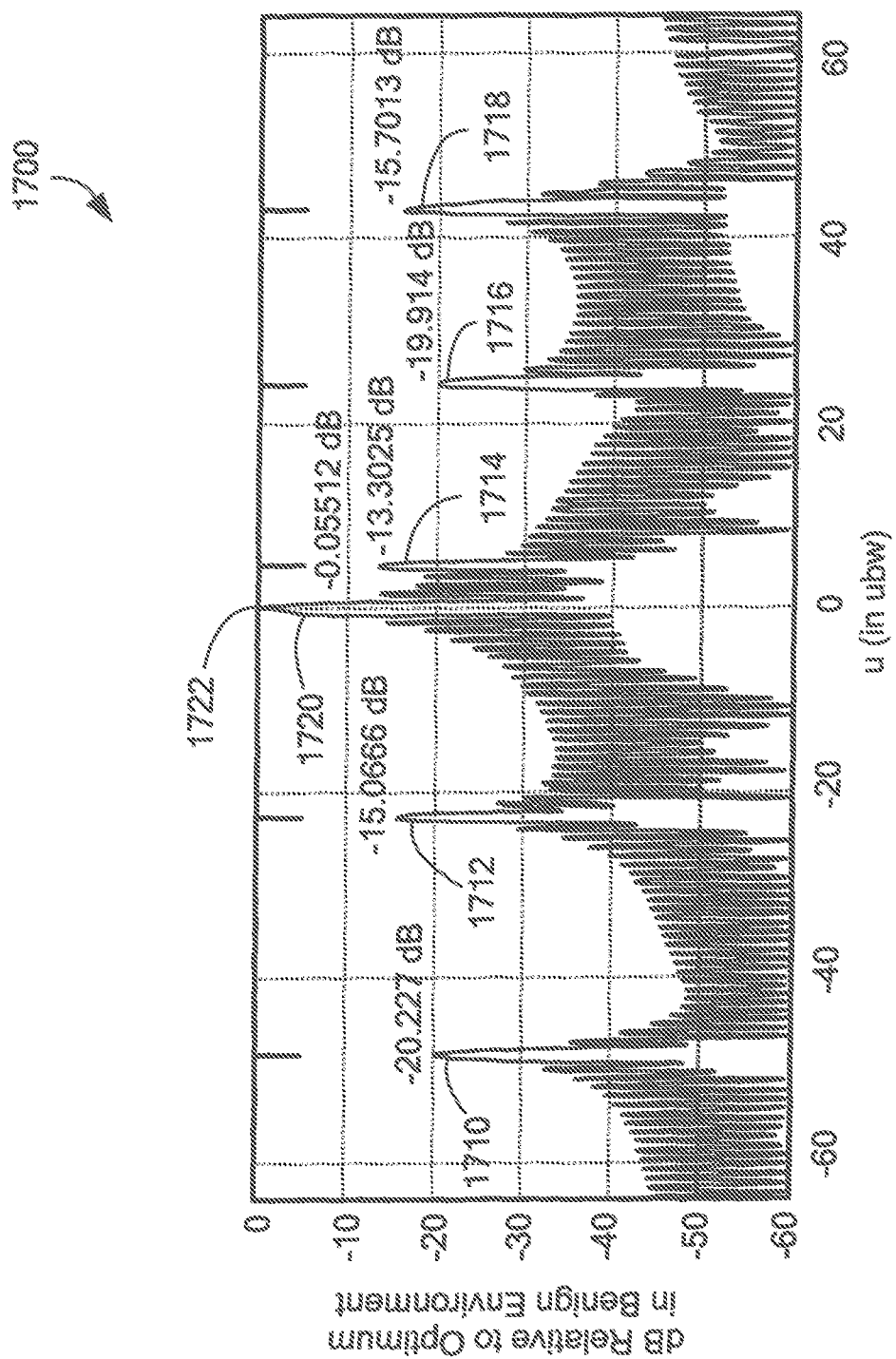
FIG. 15 is a plot showing multiple side lobes with varying power levels in a benign environment according to an embodiment.
Figure 16:
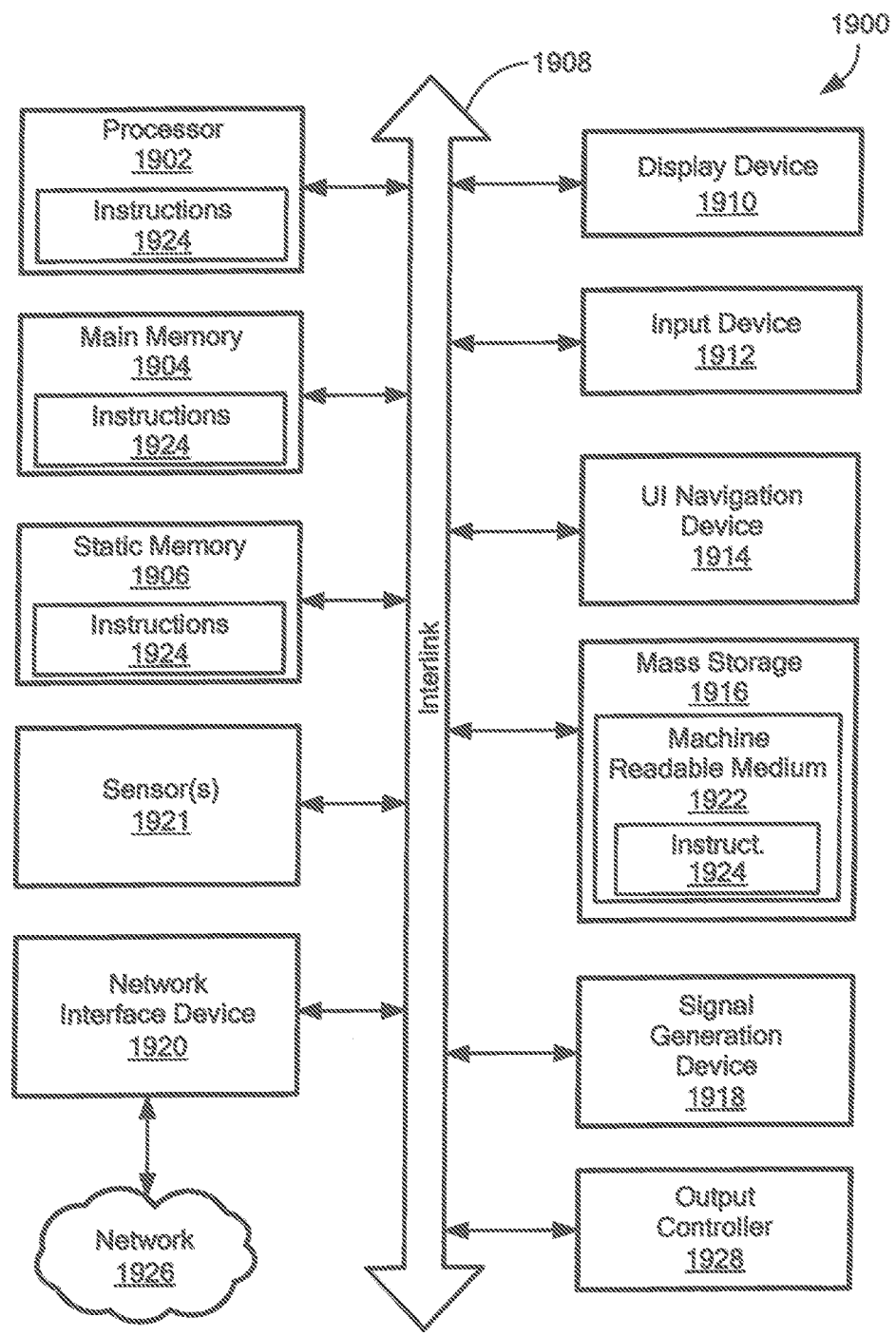
FIG. 16 illustrates a block diagram of an example machine for providing side lobe modulation to an electromagnetic signal according to an embodiment.

FIG. 15 is a plot 1700 showing multiple side lobes with varying power levels. The multiple side lobes 1710, 1712, 1714, 1716, 1718 may be controlled at the same time, at varying powers. If multiple allies exist in the environment, the side lobe for each one can be controlled simultaneously, and at independent power levels. In FIG. 16, the power level 1722 of the main lobe 1720 is 0 dB, whereas the power level of the side lobes 1710, 1712, 1714, 1716, 1718 is −20 dB, −15 dB, −15 dB, −20 dB and −15 dB.

FIG. 16 is a block diagram of an example machine 1900 for providing side lobe modulation to an electromagnetic signal according to an embodiment upon which any one or more of the techniques (e.g., methodologies) discussed herein may perform. In alternative embodiments, the machine 1900 may operate as a standalone device or may be connected (e.g., networked) to other machines. In a networked deployment, the machine 1900 may operate in the capacity of a server machine and/or a client machine in server-client network environments. In an example, the machine 1900 may act as a peer machine in peer-to-peer (P2P) (or other distributed) network environment. The machine 1900 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 1902 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module may not be instantiated at any one moment in time. For example, where the modules comprise a general-purpose hardware processor 1902 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 1900 may include a hardware processor 1902 (e.g., a central processing unit (CPU), a graphics processing unit (GPU), a hardware processor core, or any combination thereof), a main memory 1904 and a static memory 1906, at least some of which may communicate with others via an interlink (e.g., bus) 1908. The machine 1900 may further include a display unit 1910, an alphanumeric input device 1912 (e.g., a keyboard), and a user interface (UI) navigation device 1914 (e.g., a mouse). In an example, the display unit 1910, input device 1912 and UI navigation device 1914 may be a touch screen display. The machine 1900 may additionally include a storage device (e.g., drive unit) 1916, a signal generation device 1918 (e.g., a speaker), a network interface device 1920, and one or more sensors 1921, such as a global positioning system (GPS) sensor, compass, accelerometer, or other sensor. The machine 1900 may include an output controller 1928, such as a serial (e.g., universal serial bus (USB), parallel, or other wired or wireless (e.g., infrared (IR)) connection to communicate or control one or more peripheral devices (e.g., a printer, card reader, etc.).

The storage device 1916 may include at least one machine readable medium 1922 on which is stored one or more sets of data structures or instructions 1924 (e.g., software) embodying or utilized by any one or more of the techniques or functions described herein. The instructions 1924 may also reside, at least partially, additional machine readable memories such as main memory 1904, static memory 1906, or within the hardware processor 1902 during execution thereof by the machine 1900. In an example, one or any combination of the hardware processor 1902, the main memory 1904, the static memory 1906, or the storage device 1916 may constitute machine readable media.

While the machine readable medium 1922 is illustrated as a single medium, the term "machine readable medium" may include a single medium or multiple media (e.g., a centralized or distributed database, and/or associated caches and servers) that configured to store the one or more instructions 1924.

The term "machine readable medium" may include any medium that is capable of storing, encoding, or carrying instructions for execution by the machine 1900 and that cause the machine 1900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact disk-read only memory (CD-ROM) and digital video disk-read only memory (DVD-ROM) disks.

The instructions 1924 may further be transmitted or received over a communications network 1926 using a transmission medium via the network interface device 1920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1×* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 1920 may include one or more physical jacks (e.g., Ethernet, coaxial, or phone jacks) or one or more antennas to connect to the communications network 1926. In an example, the network interface device 1920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1900, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for transmitting information from a first radio frequency (RF) system to a second RF system, the system comprising:
   an antenna configurable to generate an antenna radiation pattern having a main beam and a side lobe;
   a beamformer having an input port and a plurality of beamformer output ports, each of said plurality of beamformer output ports coupled to at least corresponding one of a like plurality of antenna ports of said antenna, said beamformer capable of changing a characteristic of the antenna side lobe so as to convey information by changing the antenna side lobe characteristic.

2. The system of claim 1, wherein said beamformer is capable of changing an amplitude of the antenna side lobe so as to convey information by changing the antenna side lobe amplitude characteristic.

3. The system of claim 2 further comprising a signal generation unit configured to generate a transmit signal waveform at an output port thereof, with the signal generation unit output port coupled to the input port of said beamformer wherein said beamformer is capable of modulating an amplitude of the antenna side lobe in response to a transmit signal waveform provided thereto from said signal generation unit.

4. The system of claim 3 further comprising an amplitude and phase adjustment circuit coupled between the plurality of beamformer output ports and the plurality of antenna ports.

5. The system of claim 3 further comprising a plurality of transmit-receive (T/R) modules, each of said T/R modules having an input coupled to a corresponding one of the plurality of beamformer output ports and having an output port coupled to a corresponding one the plurality of antenna ports.

6. The system of claim 1 wherein said beamformer is capable of changing an amplitude of the antenna side lobe so as to convey information by changing the antenna side lobe amplitude characteristic using a linearly constrained minimum-variance (LCMV) beam forming technique.

7. The system of claim 5, wherein said beamformer is capable of modulating the antenna side lobe amplitude using a linearly constrained minimum-variance (LCMV) beamforming technique so as to modulate an amplitude of the side lobe to represent digital bits.

8. A method for transmitting information from a first radio frequency (RF) system having a first antenna configured to generate an antenna radiation pattern having a main beam and a side lobe to a second RF system having an antenna configured to generate an antenna radiation pattern having a main beam and a side lobe, the method comprising:
  directing an antenna side lobe of the first RF system toward the antenna main beam of second RF system; and
  modulating a characteristic of the antenna side lobe of the first RF system so as to convey information from the first RF system to the second RF system.

9. The method of claim 8, wherein modulating a characteristic of the antenna side lobe of the first RF system comprises modulating an amplitude of the side lobe.

10. The method of claim 8, wherein modulating a characteristic of the antenna side lobe of the first RF system comprises modulating an amplitude of the side lobe to represent digital bits to the second RF system.

11. The method of claim 8, wherein modulating the antenna side lobe of the first RF system comprises controlling the antenna side lobe of the first RF system using a linearly constrained minimum-variance (LCMV) beamforming technique.

12. The method of claim 8, wherein modulating the antenna side lobe of the first RF system comprises controlling the antenna side lobe amplitude using a linearly constrained minimum-variance (LCMV) beamforming technique.

13. The method of claim 12, wherein controlling the antenna side lobe amplitude using a LCMV beamforming process comprises modulating an amplitude of the side lobe to represent digital bits to the second RF system using a LCMV beamforming technique.

14. The method of claim 8 further comprising transmitting encrypted communications between the first and second RF systems.

15. The method of claim 8, wherein modulating a characteristic of the antenna side lobe of the first RF system comprises modulating an amplitude of the antenna side lobe to add data to the antenna side lobe for communication with the second RF system.

16. The method of claim 8, wherein, the first RF system corresponds to an RF jamming system.

17. A system for transmitting information from a first radio frequency (RF) system having an antenna configured to generate an antenna radiation pattern having a main beam and a side lobe, to a second RF system having an antenna configured to generate an antenna radiation pattern having a main beam and a side lobe, the system comprising:
  means for directing an antenna side lobe produced by the antenna of the first RF system toward the antenna main beam of the second RF system; and
  means for modulating a characteristic of the antenna side lobe of the antenna of the first RF system so as to convey information from the first RF system to the second RF system.

18. The system of claim 17, wherein said means for modulating a characteristic of the antenna side lobe of the first RF system comprises means for modulating an amplitude of the side lobe.

19. The system of claim 18, wherein said means for modulating a characteristic of the antenna side lobe of the first RF system comprises means for modulating an amplitude of the side lobe to represent digital bits to the second RF system.

20. The system of claim 19 wherein said means for modulating a characteristic of the antenna side lobe of the first RF system comprises means for adjusting at least an amplitude of the antenna side lobe.

* * * * *